(12) United States Patent
Huang et al.

(10) Patent No.: US 10,511,535 B2
(45) Date of Patent: Dec. 17, 2019

(54) DATA TRANSMISSION CONTROL NODE, COMMUNICATIONS SYSTEM, AND DATA TRANSMISSION MANAGEMENT METHOD

(71) Applicant: Huawei Technologies Co., Ltd., Shenzhen, Guangdong (CN)

(72) Inventors: Min Huang, Shanghai (CN); Shu Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 15/345,022

(22) Filed: Nov. 7, 2016

(65) Prior Publication Data

US 2017/0078206 A1 Mar. 16, 2017

Related U.S. Application Data

(63) Continuation of application No. PCT/CN2014/077061, filed on May 8, 2014.

(51) Int. Cl.
*H04L 12/26* (2006.01)
*H04L 29/06* (2006.01)
(Continued)

(52) U.S. Cl.
CPC ........ *H04L 47/193* (2013.01); *H04L 43/0841* (2013.01); *H04L 47/122* (2013.01);
(Continued)

(58) Field of Classification Search
CPC ..... H04L 47/193; H04L 47/27; H04L 1/1825; H04L 1/1887; H04L 47/12; H04L 69/14; H04L 69/16

See application file for complete search history.

(56) References Cited

U.S. PATENT DOCUMENTS 9,537,759 B2 * 1/2017 Calmon ............. H04B 7/15521
2012/0226802 A1 * 9/2012 Wu ........................ H04L 1/1825
709/224

(Continued)

FOREIGN PATENT DOCUMENTS

| CN | 102404077 A | 4/2012 |
|---|---|---|
| CN | 103346963 A | 10/2013 |
| WO | 2014044333 A1 | 3/2014 |

OTHER PUBLICATIONS

Ford, A., et al., "TCP Extensions for Multipath Operation with Multiple Addresses," Request for Comments: 6824, Internet Engineering Task Force (IETF), Jan. 2013, 64 pages.

(Continued)

*Primary Examiner* — Raj Jain
(74) *Attorney, Agent, or Firm* — Leydig, Voit & Mayer, Ltd.

(57) ABSTRACT

Embodiments of the present invention provide a data transmission control node, a system, and a data transmission management method. A TCP subflow on which data offloading needs to be performed is selected according to a requirement for running the system. By changing an input item of an MPTCP congestion control algorithm, data on the selected TCP subflow can be migrated to another expected TCP subflow that belongs to a same MPTCP connection as the selected TCP subflow. By taking an additional measure to manage and control MPTCP data transmission on an access network side, a result of the data offloading on the TCP subflow can satisfy the expected requirement for running the system, so as to optimize system performance, and improve practicability of the MPTCP congestion control algorithm.

16 Claims, 6 Drawing Sheets

(51) Int. Cl.
*H04L 12/707* (2013.01)
*H04L 12/801* (2013.01)
*H04L 12/803* (2013.01)
*H04L 12/823* (2013.01)
*H04W 28/08* (2009.01)

(52) U.S. Cl.
CPC .............. *H04L 47/32* (2013.01); *H04L 69/14* (2013.01); *H04W 28/08* (2013.01); *H04L 45/24* (2013.01)

(56) References Cited

U.S. PATENT DOCUMENTS

2013/0064198 A1 3/2013 Krishnaswamy et al.
2015/0237525 A1* 8/2015 Mildh ............... H04W 28/0215
  370/230.1
2016/0309534 A1* 10/2016 Teyeb ..................... H04L 69/14
2017/0078206 A1* 3/2017 Huang .................. H04L 47/193

OTHER PUBLICATIONS

Hu, M., et al., "The Research of Adaptive Weighted Congestion Control in MPTCP," 2011 International Conference on Electrical and Control Engineering (ICECE), XP31960575A, Sep. 2011, pp. 1350-1353.

Raiciu, C., et al., "Coupled Congestion Control for Multipath Transport Protocols," Request for Comments: 6356, Internet Engineering Task Force (IETF), Oct. 2011, 12 pages.

Tao, Y., et al., "Congestion Control for Multipath Transport Control Protocol Based on Compensating for RTT Mismatch," vol. 37, No. 7, Huawei, Apr. 2, 2013, 9 pages.

* cited by examiner

HMAC-A=HMAC(Key=(Key-A+Key-B), Msg=(R-A+R-B))
HMAC-B=HMAC(Key=(Key-B+Key-A), Msg=(R-B+R-A))

DATA TRANSMISSION CONTROL NODE, COMMUNICATIONS SYSTEM, AND DATA TRANSMISSION MANAGEMENT METHOD

CROSS-REFERENCE TO RELATED APPLICATIONS

This application is a continuation of International Application No. PCT/CN2014/077061, filed on May 8, 2014, the disclosure of which is hereby incorporated by reference in its entirety.

TECHNICAL FIELD

Embodiments of the present invention relate to the field of communications technologies, and in particular, to a data transmission control node, a communications system, and a data transmission management method.

BACKGROUND

With increasing development of multiple wireless broadband access technologies, one user equipment (UE) may have multiple data transmission links connected to a target node. Developing from the traditional TCP protocol, the Multipath Transmission Control Protocol (MPTCP) may provide end-to-end multi-link communication for a user terminal, and distribute a data stream to multiple links in a resource sharing manner to improve network bandwidth.

To improve data transmission quality, a congestion control algorithm referred to as coupled congestion control is defined in the MPTCP protocol. An expected objective of the coupled congestion control is to balance congestion, that is, to offload as much data as possible from a most congested link to another link. Although data offloading can be performed between different communication links by using an end-to-end congestion control algorithm stipulated in an existing protocol, a result of the data offloading cannot fully satisfy various expected requirements for running a system. Consequently, system performance cannot be optimized, and practicability of the congestion control algorithm is relatively poor.

SUMMARY

Embodiments of the present invention provide a data transmission control node, a communications system, and a data transmission management method, so that a result of MPTCP data offloading can satisfy an expected requirement for running a system.

According to a first aspect, an embodiment of the present invention provides a data transmission control node, configured to control data transmission between two communication parties of a Multipath Transmission Control Protocol MPTCP connection, where the MPTCP connection includes multiple Transmission Control Protocol TCP subflows, and the data transmission control node includes: a processing unit, configured to select at least one TCP subflow on which data transmission control needs to be performed from the multiple TCP subflows, where the processing unit is further configured to determine an adjustment policy for an input item of an MPTCP congestion control algorithm; and a sending unit, configured to send the adjustment policy to a network node corresponding to the at least one TCP subflow, where the adjustment policy is used to instruct the network node to adjust a data transmission process on the at least one TCP subflow and trigger the two communication parties to perform the MPTCP congestion control algorithm, and an output result of the MPTCP congestion control algorithm includes determining to migrate a part or all of data transmitted on the at least one TCP subflow to another TCP subflow that belongs to the MPTCP connection, and the network node is located in a communication link between the two communication parties.

In a first possible implementation manner of the first aspect, that the processing unit is configured to determine an adjustment policy for an input item of an MPTCP congestion control algorithm includes: determining to reduce a data transmission rate of the at least one TCP subflow, and determining a reduction degree of the data transmission rate.

With reference to any one of the foregoing possible implementation manner of the first aspect, the input item of the MPTCP congestion control algorithm includes a data round trip time RTT and/or a packet loss rate that are/is of the at least one TCP subflow.

With reference to any one of the foregoing possible implementation manners of the first aspect, that the sending unit is configured to instruct the network node to adjust a data transmission process on the at least one TCP subflow to obtain an adjusted input item includes: instructing the network node to delay sending a data packet on the at least one TCP subflow to increase the RTT, where a delay time is corresponding to the reduction degree of the data transmission rate; and/or instructing the network node to discard a service data packet on the at least one TCP subflow to increase the packet loss rate, where a quantity of discarded service data packets is corresponding to the reduction degree of the data transmission rate.

With reference to any one of the foregoing possible implementation manners of the first aspect, that the processing unit is configured to select at least one TCP subflow on which data transmission control needs to be performed from the multiple TCP subflows includes: selecting the at least one TCP subflow according to a management and control policy of an operator.

With reference to any one of the foregoing possible implementation manners of the first aspect, that the processing unit is configured to select at least one TCP subflow on which data transmission control needs to be performed from the multiple TCP subflows includes: determining, according to radio resource statuses of network nodes corresponding to the multiple TCP subflows, a network node on which data transmission control needs to be performed, and selecting at least one TCP subflow that is corresponding to the network node and on which data is being transmitted.

With reference to any one of the foregoing possible implementation manners of the first aspect, that the processing unit is configured to select at least one TCP subflow on which data transmission control needs to be performed from the multiple TCP subflows includes: determining whether conditions of communication links in which the multiple TCP subflows are located satisfy a preset condition, and selecting at least one TCP subflow on which data is being transmitted from TCP subflows that do not satisfy the preset condition.

With reference to any one of the foregoing possible implementation manners of the first aspect, the data transmission control node further includes a receiving unit, configured to receive a measurement report reported by the network node, where the measurement report is used to indicate the conditions of the communication links of the multiple TCP subflows and/or the radio resource statuses of the network nodes corresponding to the multiple TCP subflows, and the processing unit is specifically configured to select the at least one TCP subflow according to the measurement report.

With reference to any one of the foregoing possible implementation manners of the first aspect, the data transmission control node further includes an information management unit, configured to associate the multiple TCP subflows with the MPTCP connection according to an MPTCP connection message, so that the MPTCP connection includes the multiple TCP subflows, where the MPTCP connection message is used to indicate a status of the MPTCP connection.

With reference to any one of the foregoing possible implementation manners of the first aspect, the information management unit is further configured to store and update an MPTCP connection information table, where the MPTCP connection information table includes MPTCP connection information carried in the MPTCP connection message reported by the network node, and the MPTCP connection information is used to associate the multiple TCP subflows with the MPTCP connection.

With reference to any one of the foregoing possible implementation manners of the first aspect, one of the two communication parties is user equipment UE accessing the network node, the other party is a server, and the network node supports mutual communication between the UE and the server.

According to a second aspect, an embodiment of the present invention provides a network node, configured to control data transmission between two communication parties of a Multipath Transmission Control Protocol MPTCP connection, where the MPTCP connection includes multiple Transmission Control Protocol TCP subflows, and the network node is located in a communication link between the two communication parties and includes:

a receiving unit, configured to receive information about at least one TCP subflow selected by a data transmission control node from the multiple TCP subflows; where the receiving unit is further configured to receive an adjustment policy indicated by the data transmission control node, where the adjustment policy is an adjustment policy for an input item of an MPTCP congestion control algorithm; and a policy execution unit, configured to: adjust a data transmission process on the at least one TCP subflow according to the adjustment policy, and trigger the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

In a first possible implementation manner of the second aspect, the network node further includes a sending unit, configured to send an adjusted input item to the two communication parties, where the adjusted input item is obtained after the policy execution unit adjusts the data transmission process on the at least one TCP subflow, and is used to trigger the two communication parties to perform the MPTCP congestion control algorithm.

With reference to any one of the foregoing implementation manner of the second aspect, the adjustment policy for the input item of the MPTCP congestion control algorithm includes reducing a data transmission rate of the at least one TCP subflow, and includes a reduction degree of the data transmission rate.

With reference to any one of the foregoing possible implementation manners of the second aspect, the input item of the MPTCP congestion control algorithm includes a data round trip time RTT and/or a packet loss rate that are/is of the at least one TCP subflow.

With reference to any one of the foregoing possible implementation manners of the second aspect, that the policy execution unit is configured to adjust a data transmission process on the at least one TCP subflow includes: delaying sending a data packet on the at least one TCP subflow to increase the RTT, where a delay time is corresponding to the reduction degree of the data transmission rate; and/or discarding a service data packet on the at least one TCP subflow to increase the packet loss rate, where a quantity of discarded service data packets is corresponding to the reduction degree of the data transmission rate.

With reference to any one of the foregoing possible implementation manners of the second aspect, the sending unit is further configured to report a measurement report to the data transmission control node, where the measurement report is used to indicate conditions of communication links of the multiple TCP subflows and/or radio resource statuses of network nodes corresponding to the multiple TCP subflows, and the measurement report is used by the data transmission control node to select the at least one TCP subflow.

With reference to any one of the foregoing possible implementation manners of the second aspect, the sending unit is further configured to report an MPTCP connection message to the data transmission control node, where the MPTCP connection message is used to indicate a status of the MPTCP connection, the MPTCP connection message carries MPTCP connection information, and the MPTCP connection information is used by the data transmission control node to associate the multiple TCP subflows with the MPTCP connection, so that the MPTCP connection includes the multiple TCP subflows.

With reference to any one of the foregoing possible implementation manners of the second aspect, one of the two communication parties is user equipment UE accessing the network node, the other party is a server, and the network node supports mutual communication between the UE and the server.

According to a third aspect, an embodiment of the present invention provides a communications system, including:

a data transmission control node, configured to: select at least one TCP subflow on which data transmission control needs to be performed from the multiple TCP subflows; determine an adjustment policy for an input item of an MPTCP congestion control algorithm; and send the adjustment policy to a network node corresponding to the at least one TCP subflow, where the adjustment policy is used to instruct the network node to adjust a data transmission process on the at least one TCP subflow and trigger the two communication parties to perform the MPTCP congestion control algorithm, and an output result of the MPTCP congestion control algorithm includes determining to migrate a part or all of data transmitted on the at least one TCP subflow to another TCP subflow that belongs to the MPTCP connection; and a network node, located in a communication link between the two communication parties, and configured to: receive information about the at least one TCP subflow selected by the data transmission control node from the multiple TCP subflows, and receive the adjustment policy indicated by the data transmission control node, where the adjustment policy is an adjustment policy for the input item of the MPTCP congestion control algorithm.

According to a fourth aspect, an embodiment of the present invention provides a data transmission management method, used to control data transmission between two communication parties of a Multipath Transmission Control Protocol MPTCP connection, where the MPTCP connection includes multiple Transmission Control Protocol TCP subflows, and the method includes: selecting, by a data transmission control node, at least one TCP subflow on which data transmission control needs to be performed from the multiple TCP subflows; determining, by the data transmission control node, an adjustment policy for an input item of an MPTCP congestion control algorithm; and instructing, by the data transmission control node, a network node corresponding to the at least one TCP subflow to adjust a data transmission process on the at least one TCP subflow according to the adjustment policy, and trigger the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

In a first possible implementation manner of the fourth aspect, the determining, by the data transmission control node, an adjustment policy for an input item of an MPTCP congestion control algorithm includes: determining, by the data transmission control node, to reduce a data transmission rate of the at least one TCP subflow, and determining a reduction degree of the data transmission rate.

With reference to any one of the foregoing possible implementation manners of the fourth aspect, the input item of the MPTCP congestion control algorithm includes a data round trip time RTT and/or a packet loss rate that are/is of the at least one TCP subflow.

With reference to the foregoing possible implementation manner of the fourth aspect, the instructing, by the data transmission control node, the network node to adjust a data transmission process on the at least one TCP subflow includes: instructing, by the data transmission control node, the network node to delay sending a data packet on the at least one TCP subflow to increase the RTT, where a delay time is corresponding to the reduction degree of the data transmission rate; and/or instructing, by the data transmission control node, the network node to discard a service data packet on the at least one TCP subflow to increase the packet loss rate, where a quantity of discarded service data packets is corresponding to the reduction degree of the data transmission rate.

With reference to any one of the foregoing possible implementation manners of the fourth aspect, the selecting, by a data transmission control node, at least one TCP subflow on which data transmission control needs to be performed from the multiple TCP subflows includes: selecting, by the data transmission control node, the at least one TCP subflow according to a management and control policy of an operator.

With reference to any one of the foregoing possible implementation manners, the selecting, by a data transmission control node, at least one TCP subflow on which data transmission control needs to be performed from the multiple TCP subflows includes: determining, by the data transmission control node according to radio resource statuses of network nodes corresponding to the multiple TCP subflows, a network node on which data transmission control needs to be performed, and selecting at least one TCP subflow that is corresponding to the network node and on which data is being transmitted.

With reference to any one of the foregoing possible implementation manners, the selecting, by a data transmission control node, at least one TCP subflow on which data transmission control needs to be performed from the multiple TCP subflows includes: determining, by the data transmission control node, whether conditions of communication links in which the multiple TCP subflows are located satisfy a preset condition, and selecting at least one TCP subflow on which data is being transmitted from TCP subflows that do not satisfy the preset condition.

With reference to any one of the foregoing possible implementation manners, the selecting, by a data transmission control node, at least one TCP subflow on which data transmission control needs to be performed from the multiple TCP subflows includes: receiving, by the data transmission control node, a measurement report reported by the network node, where the measurement report is used to indicate the conditions of the communication links of the multiple TCP subflows and/or the radio resource statuses of the network nodes corresponding to the multiple TCP subflows; and selecting, by the data transmission control node, the at least one TCP subflow according to the measurement report.

With reference to any one of the foregoing possible implementation manners, the method further includes: associating, by the data transmission control node, the multiple TCP subflows with the MPTCP connection according to an MPTCP connection message, so that the MPTCP connection includes the multiple TCP subflows, where the MPTCP connection message is used to indicate a status of the MPTCP connection.

With reference to any one of the foregoing possible implementation manners, the method further includes: storing and updating, by the data transmission control node, an MPTCP connection information table, where the MPTCP connection information table includes MPTCP connection information carried in the MPTCP connection message reported by the network node, and the MPTCP connection information is used to associate the multiple TCP subflows with the MPTCP connection.

With reference to any one of the foregoing possible implementation manners of the fourth aspect, one of the two communication parties is user equipment UE accessing the network node, the other party is a server, and the network node supports mutual communication between the UE and the server.

According to a fifth aspect, an embodiment of the present invention provides a data transmission management method, used to control data transmission between two communication parties of a Multipath Transmission Control Protocol MPTCP connection, where the MPTCP connection includes multiple Transmission Control Protocol TCP subflows, a network node is located in a communication link between the two communication parties, and the method includes: receiving, by the network node, information about at least one TCP subflow selected by a data transmission control node from the multiple TCP subflows; and adjusting, by the network node, a data transmission process on the at least one TCP subflow according to an adjustment policy indicated by the data transmission control node, and triggering the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection, and the adjustment policy is an adjustment policy for an input item of the MPTCP congestion control algorithm.

In a first possible implementation manner of the fifth aspect, after the adjusting, by the network node, a data transmission process on the at least one TCP subflow, the method further includes: sending, by the network node, an adjusted input item to the two communication parties, where the adjusted input item is obtained after the network node adjusts the data transmission process on the at least one TCP subflow, and is used to trigger the two communication parties to perform the MPTCP congestion control algorithm.

With reference to any one of the foregoing implementation manner of the fifth aspect, the adjustment policy for the input item of the MPTCP congestion control algorithm includes reducing a data transmission rate of the at least one TCP subflow, and includes a reduction degree of the data transmission rate.

With reference to any one of the foregoing possible implementation manners of the fifth aspect, the input item of the MPTCP congestion control algorithm includes a data round trip time RTT and/or a packet loss rate that are/is of the at least one TCP subflow.

With reference to any one of the foregoing possible implementation manners of the fifth aspect, the adjusting, by the network node, a data transmission process on the at least one TCP subflow includes: delaying, by the network node, sending a data packet on the at least one TCP subflow to increase the RTT, where a delay time is corresponding to the reduction degree of the data transmission rate; and/or discarding, by the network node, a service data packet on the at least one TCP subflow to increase the packet loss rate, where a quantity of discarded service data packets is corresponding to the reduction degree of the data transmission rate.

With reference to any one of the foregoing possible implementation manners of the fifth aspect, the method further includes: reporting, by the network node, a measurement report to the data transmission control node, where the measurement report is used to indicate conditions of communication links of the multiple TCP subflows and/or radio resource statuses of network nodes corresponding to the multiple TCP subflows, and the measurement report is used by the data transmission control node to select the at least one TCP subflow.

With reference to any one of the foregoing possible implementation manners of the fifth aspect, the method further includes: reporting, by the network node, an MPTCP connection message to the data transmission control node, where the MPTCP connection message is used to indicate a status of the MPTCP connection, the MPTCP connection message carries MPTCP connection information, and the MPTCP connection information is used by the data transmission control node to associate the multiple TCP subflows with the MPTCP connection, so that the MPTCP connection includes the multiple TCP subflows.

With reference to any one of the foregoing possible implementation manners of the fifth aspect, one of the two communication parties is user equipment UE accessing the network node, the other party is a server, and the network node supports mutual communication between the UE and the server.

By using the technical solutions provided in the embodiments of the present invention, a TCP subflow on which data offloading needs to be performed is selected according to a requirement for running a system. By changing an input item of an MPTCP congestion control algorithm, data on the selected TCP subflow can be migrated to another expected TCP subflow that belongs to a same MPTCP connection as the selected TCP subflow. By taking an additional measure to manage and control MPTCP data transmission on an access network side, a result of the data offloading on the TCP subflow can satisfy the expected requirement for running the system, so as to optimize system performance, and improve practicability of the MPTCP congestion control algorithm.

DETAILED DESCRIPTION

Figure 1:
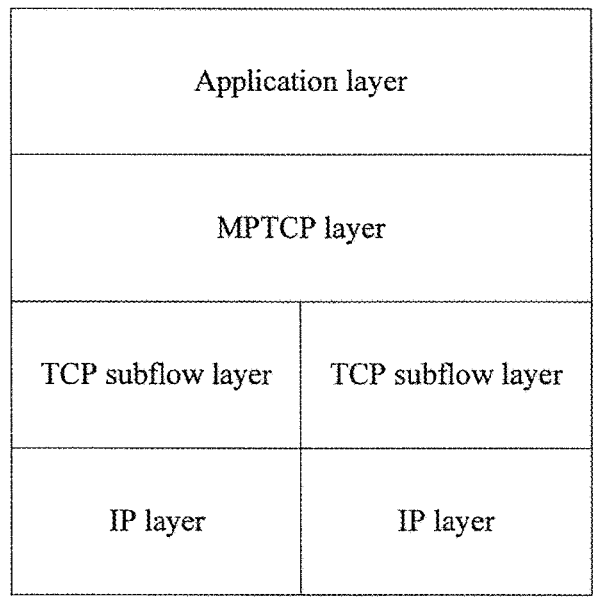
FIG. 1 is a schematic diagram of an MPTCP protocol stack.

To make the objectives, technical solutions, and advantages of the present invention clearer, the following further describes implementation manners of the present invention in detail with reference to the accompanying drawings.

Technologies described in this specification may be applied to various communications systems, for example, current 2G and 3G communications systems and a next generation communications system, such as a Global System for Mobile Communications (GSM), a Code Division Multiple Access (CDMA) system, a Time Division Multiple Access (TDMA) system, a Wideband Code Division Multiple Access (WCDMA) system, a Long Term Evolution (LTE) system and a subsequent evolved system, and other wireless broadband access networks such as a wireless local area network (WLAN) and a Worldwide Interoperability for Microwave Access (WiMax) system.

It should be noted that, a network node described in embodiments of the present invention may be an access device, for example, may be a base transceiver station (BTS) in the GSM or the CDMA, a NodeB in the WCDMA, an evolved NodeB (e-NodeB) in the LTE, an access point (AP)

in the WLAN, or a network element with a similar function in another communications system or radio network system, which is not limited in the embodiments of the present invention. Alternatively, the network node may be an access control device, for example, may be a base station controller (BSC) in the GSM or the CDMA, a radio network controller (RNC) in the WCDMA, an access controller (AC) in the WLAN, or another network element with a similar function, which is not limited in the embodiments of the present invention.

It should be noted that, a data transmission control node proposed in the embodiments of the present invention indicates a unit on an access network side that is used to manage and control MPTCP data transmission. The data transmission control node has an unlimited deployment position, and may be separately deployed, or may be deployed together with a network management device, an access control device, and an access device. In other words, the control node may be an independent device, or may be deployed in another communications device, which is not limited in the embodiments of the present invention.

For example, the data transmission control node may serve as a control unit and be deployed in the foregoing access control device such as a BSC, an RNC, or an AC; or the data transmission control node may serve as a control unit and be deployed in the foregoing access device such as a BTS, a NodeB, an e-NodeB, or an AP. For another example, the data transmission control node may be an independently deployed device, and can exchange information with the foregoing access device or access control device that serves as a network node.

User equipment (UE) occurred in the embodiments of the present invention may be user equipment that accesses an access network in a wireless manner to perform data transmission, for example, a mobile phone, or a personal computer with a wireless communication function.

It should be noted that, the access network described in the embodiments of the present invention includes a radio access network (RAN) that includes devices such as the BTS and the BSC, or the NodeB and the RNC, or the e-NodeB, and a broadband access network that includes devices such as the AP and the AC. The AC and the RNC may be integrated, that is, a function of the AC is integrated on the RNC, and the AC communicates with the AP.

FIG. 1 is a schematic diagram of an MPTCP protocol stack. In comparison with a standard TCP, in the MPTCP protocol stack, a TCP layer is mainly divided into an MPTCP layer and a TCP subflow layer, and concurrent data transmission is implemented in the following manner: establishing multiple TCP subflows, which is equivalent to establishing multiple TCP connections; and performing, at the MPTCP layer, processing such as data offloading or convergence on the multiple TCP subflows. A TCP subflow may be associated, by using a token, with an MPTCP connection to which the TCP subflow belongs. The token is an identifier of the MPTCP connection, and has uniqueness and only local meanings. An initiator party and a responder party of an initial MPTCP connection establishment process each need to generate a token, where the token may be regarded as an MPTCP connection identifier (MPTCP Connection ID).

The MPTCP connection may include multiple TCP subflows. The TCP subflow is a TCP data stream transmitted on a particular transmission path. The transmission path refers to a path between two communication parties of the MPTCP connection, and may be identified by using a pair of addresses of the two communication parties, for example, IP addresses and/or port numbers (port). Each TCP subflow has a corresponding path.

The MPTCP is an end-to-end protocol, and therefore, the two communication parties need to exchange control signaling to complete functions such as initial MPTCP connection establishment, TCP subflow addition or deletion, and address notification. The control signaling is transmitted by using a TCP option.

It should be noted that, for meanings and functions of specific MPTCP signaling involved in this embodiment of the present invention, reference may be made to stipulations in the RFC6824 protocol, and details are not described in this specification.

Figure 2:
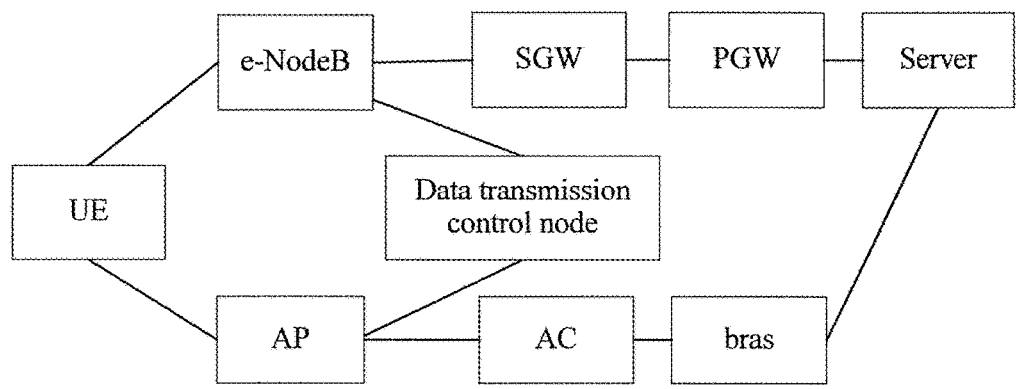
FIG. 2 is a schematic diagram of an application scenario according to an embodiment of the present invention.

FIG. 2 is a schematic diagram of an application scenario according to an embodiment of the present invention. As shown in FIG. 2, an MPTCP connection between UE and a server has two TCP subflows. One TCP subflow is transmitted on an LTE link, and the LTE link includes an e-NodeB serving as an access network side node, and an independent service gateway (SGW) and a packet data network gateway (PGW) that serve as core network side nodes. The other TCP subflow is transmitted on a Wi-Fi link, and the Wi-Fi link includes an AP and an AC that serve as access network side nodes, and a broadband remote access server (BRAS) serving as a core network side node. As shown in FIG. 2, a data transmission control node provided in this embodiment of the present invention may be independently deployed, and has a link connection with either of the e-NodeB and the AP, so as to facilitate information exchange. The e-NodeB and the AP may each report an MPTCP connection message to the data transmission control node, where the MPTCP connection message is obtained by the e-NodeB or the AP by parsing a process of MPTCP signaling exchange between the UE and the server, for example, obtained by parsing a TCP data packet that is of an accessed user and carries MPTCP signaling. The data transmission control node associates, according to the MPTCP connection message, different TCP subflows that belong to the MPTCP connection, and may determine, according to a condition such as an operator policy, a radio resource status of an access network side node accessed by an accessed user, or a condition of a link in which an accessed user is located, a policy for allocating data to the different TCP subflows, and finally deliver the allocation policy to the e-NodeB and the AP for execution.

An embodiment of the present invention provides a data transmission control node, which may be configured to control data transmission between two communication parties of an MPTCP connection, where the MPTCP connection includes multiple Transmission Control Protocol TCP subflows.

The two communication parties of the MPTCP connection may be communications devices at two parties of an air-interface uplink or downlink data transmission process. Either of the parties may initiate or respond to a related process of the MPTCP connection, which includes an initial MPTCP connection establishment process, a TCP subflow creation process, a TCP subflow deletion process, a TCP subflow priority update process, and the like. For example, if UE that accesses a radio access point initiates an initial MPTCP connection establishment process, and a server on a network side makes a response, the UE and the server become the two communication parties of the MPTCP connection. Similarly, the server may initiate the initial MPTCP connection establishment process, and the UE makes a response. It should be noted that, there is no mutual correspondence among an initiator party or a responder party of the initial MPTCP connection establishment process, an initiator party or a responder party of the TCP subflow creation process, and a transmit party or a receive party of a subsequent data transmission process. For example, either the initiator party or the responder party of the initial MPTCP connection establishment process may initiate the TCP subflow creation process, and among the initiator party or the responder party of the initial MPTCP connection establishment process and the initiator party or the responder party of the TCP subflow creation process, any party may send data.

Figure 3:
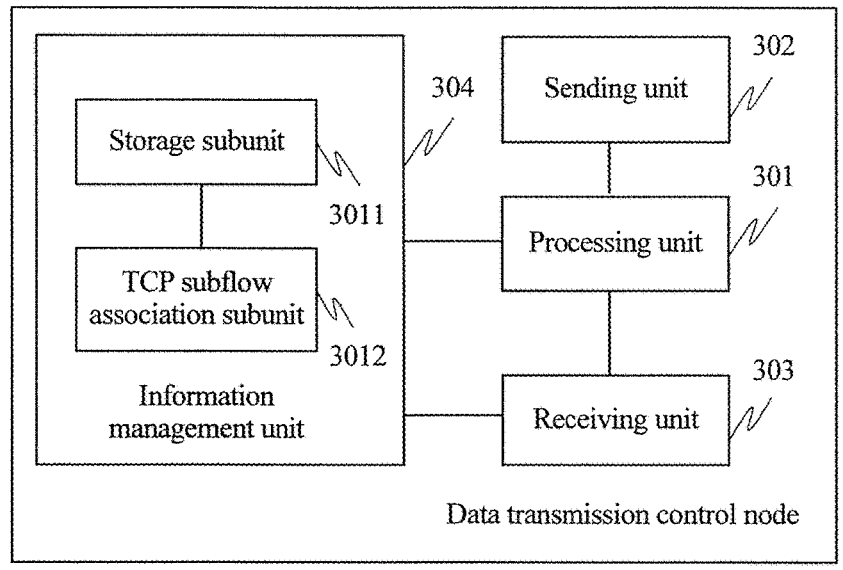
FIG. 3 is a schematic block diagram of a data transmission control node according to an embodiment of the present invention.

A schematic block diagram of the data transmission control node is shown in FIG. 3, and the data transmission control node mainly includes a processing unit 301 and a sending unit 302.

The processing unit 301 may be configured to select at least one TCP subflow on which data transmission control needs to be performed from the multiple TCP subflows.

Specifically, the processing unit 301 may determine to select a TCP subflow on which air-interface downlink or uplink data is to be migrated to another TCP subflow that belongs to the same MPTCP connection, and classify, according to a data transmission direction, the TCP subflow on which data needs to be migrated into an air-interface downlink or uplink management and control subflow set.

The processing unit 301 may be further configured to determine an adjustment policy for an input item of an MPTCP congestion control algorithm.

The sending unit 302 is configured to send the adjustment policy to a network node corresponding to the at least one TCP subflow, where the adjustment policy is used to instruct the network node to adjust a data transmission process on the at least one TCP subflow and trigger the two communication parties to perform the MPTCP congestion control algorithm, and an output result of the MPTCP congestion control algorithm includes determining to migrate a part or all of data transmitted on the at least one TCP subflow to another TCP subflow that belongs to the MPTCP connection.

The network node is located in a communication link between the two communication parties.

A process for sending the foregoing adjustment policy includes traversing the air-interface downlink or uplink management and control subflow set, and delivering the adjustment policy to a network node in which each TCP subflow in the management and control subflow set is located.

Optionally, there may be multiple ways to determine to select a TCP subflow on which air-interface downlink or uplink data is to be migrated to another TCP subflow that belongs to the same MPTCP connection, which is not specially limited in this embodiment of the present invention. For example, the following two methods may be used:

Method 1: First, a radio access point that needs to be controlled is obtained according to a status, in an MPTCP connection information table, of an air-interface downlink or uplink radio resource of a radio resource point. For example, a radio access point at which air-interface downlink or uplink load is congested is selected. Optionally, determining may be performed with reference to a management and control policy of an operator. Second, all TCP subflows of each radio access point that needs to be controlled are traversed. If an MPTCP connection to which a current TCP subflow belongs has another TCP subflow whose air-interface downlink or uplink backup flag bit is 0, a radio access point in which the another TCP subflow is located is not a current radio access point, and an air-interface downlink or uplink radio resource of the radio resource point in which the another TCP subflow is located is in an idle state, the current TCP subflow is selected into the air-interface downlink or uplink management and control subflow set.

Method 2: All TCP subflows in an MPTCP connection information table are traversed. If air-interface link information of an accessed user to which a current subflow belongs indicates that an air-interface downlink or uplink of a link is unsuitable for data transmission. For example, if the current TCP subflow is located on a link with poor quality or the accessed user is located at a cell edge, an MPTCP connection to which the current TCP subflow belongs has another TCP subflow whose air-interface downlink or uplink backup flag bit is 0, a radio access point in which the another TCP subflow is located is not a radio access point of the current TCP subflow, and air-interface link information of an accessed user to which the another TCP subflow belongs indicates that an air-interface downlink or uplink is suitable for data transmission, the current TCP subflow is selected into the air-interface downlink or uplink management and control subflow set.

Optionally, a quantity of TCP subflows in the management and control subflow set may be limited.

Optionally, a TCP subflow that is on a current radio access point and is corresponding to a user with a high priority may be preferably selected into the management and control subflow set with reference to a user priority.

Data migration may be migrating a part of data on a TCP subflow to another TCP subflow that belongs to a same MPTCP connection as the TCP subflow, or may be migrating all data on a TCP subflow to another TCP subflow that belongs to a same MPTCP connection as the TCP subflow. A proportion of migrated data may be determined according to an optimization objective for running a system, which is not specially limited in this embodiment of the present invention.

Optionally, in another embodiment of the present invention, that the processing unit 301 is configured to determine an adjustment policy for an input item of an MPTCP congestion control algorithm includes: determining to reduce a data transmission rate of the at least one TCP subflow, and determining a reduction degree of the data transmission rate.

Specifically, when a speed of a TCP subflow that is being used by the two communication parties is reduced to an extent, the TCP subflow does not satisfy a performance requirement for data transmission. The two communication parties may detect by themselves rate information of the TCP subflow or obtain rate information of the TCP subflow from a network node, enable the MPTCP congestion control algorithm, and switch the TCP subflow.

Optionally, the processing unit 301 may determine a specific implementation form of the adjustment policy, and the sending unit 302 delivers the specific implementation form of the adjustment policy to a corresponding network node for direct execution. Alternatively, the processing unit 301 may give only a migration policy of a TCP subflow, and deliver the migration policy to a corresponding network node, and the network node determines by itself a specific form to be used to perform data migration. For example, the adjustment policy may include only an extent to which a rate of a TCP subflow needs to be reduced, and a network node may determine by itself a specific form to be used. For example, the offloading policy is satisfied in a manner such as delayed sending, or a packet loss rate increase. Similarly, the adjustment policy may directly instruct a network node to reduce a rate of a TCP subflow by delayed sending, or a packet loss rate increase.

Optionally, a round trip time (RTT) and/or a packet loss rate of a TCP layer that are/is used as the input item of the MPTCP congestion control algorithm may be changed, and an adjusted RTT and/or packet loss rate are/is used as the input item of the MPTCP congestion control algorithm to affect the output result of the algorithm, so that data on all TCP subflows can complete a migration process that satisfies an expected requirement.

Optionally, the adjustment policy may include instructing the network node to delay sending a data packet on the at least one TCP subflow to increase the RTT, where a delay time is corresponding to the reduction degree of the data transmission rate.

Optionally, the adjustment policy may include instructing the network node to discard a service data packet on the at least one TCP subflow to increase the packet loss rate, where a quantity of discarded service data packets is corresponding to the reduction degree of the data transmission rate.

The foregoing processes for changing the RTT and the packet loss rate may be simultaneously performed, that is, the data transmission rate of the TCP subflow is changed by comprehensively using the RTT and the packet loss rate; or may be separately performed, which is not specially limited in this embodiment of the present invention.

Specifically, a data offloading result of an MPTCP congestion control algorithm stipulated in an existing protocol mainly depends on an RTT and a packet loss rate. Therefore, RTTs and packet loss rates that are of all communication links may be used as input to affect an output result of the MPTCP congestion control algorithm. For example, a packet loss rate on a link is increased, so that data is migrated to another link under the impact of the congestion control algorithm. Therefore, the foregoing adjustment policy may indirectly affect the output result of the foregoing algorithm by changing the RTT and/or the packet loss rate that are/is of the TCP layer, so that a data offloading result can satisfy different requirements for running the system.

It may be understood that, the MPTCP congestion control algorithm used in this embodiment of the present invention is a Coupled Congestion Control algorithm stipulated in an existing protocol. For an operation process of the algorithm, refer to related content in the protocol. For example, items such as slow start, fast retransmit, and fast recovery in each TCP subflow are consistent with those in the existing algorithm. For details, reference may be made to RFC6356, and details are not described herein.

The following describes several specific methods for changing a packet loss rate or an RTT, which are merely exemplary and shall not constitute any limitation on this embodiment of the present invention. A person skilled in the art may understand that the packet loss rate or the RTT may be changed in other manners.

For example, a network node may be instructed to increase the packet loss rate by proactively discarding an air-interface downlink or uplink service data packet on a TCP subflow, for example, increasing the packet loss rate to a specified proportion, or proactively discarding one data packet every other data packets.

For example, a network node may be instructed to increase the RTT of the TCP layer by delaying sending an air-interface uplink or downlink ACK packet on a subflow, for example, specifying that sending of the air-interface uplink or downlink ACK packet on the subflow is delayed after a particular time period.

For example, a network node may be instructed to increase the RTT of the TCP layer by causing an air-interface downlink or uplink data packet on a subflow to delay entering a scheduler, for example, specifying that data on a TCP subflow enters the scheduler after a time delay.

For example, a network node may be instructed to increase the RTT of the TCP layer by affecting a behavior of a scheduler, for example, by not scheduling air-interface downlink or uplink data on a TCP subflow, by reducing a scheduling priority of an air-interface downlink or uplink of a TCP subflow to an extent, or by causing a delay of a particular value to a time point at which the scheduler senses a requirement for scheduling downlink or uplink data on a TCP subflow.

In another embodiment of the present invention, the processing unit 301 may be specifically configured to select the TCP subflow according to at least one condition in a management and control policy of an operator, a condition of a communication link, or a radio resource status.

Optionally, the processing unit 301 is configured to select the at least one TCP subflow according to the management and control policy of the operator.

The management and control policy of the operator includes items such as system load balance, utilization efficiency of a link resource, and a charging policy that represent a trend in management and control of an entire network by the operator. A scenario of concurrently sending LTE data and Wi-Fi data is used as an example for description. UE located at an LTE network edge has a communication link with poor quality, and the operator may tend to transmit more data on a Wi-Fi link with relatively high spectral efficiency. However, there is no direct correspondence between quality or spectral efficiency of a communication link and an RTT or a packet loss rate of the link. Therefore, when data offloading and scheduling depends only on RTTs and packet loss rates that objectively exist on an LTE link and a Wi-Fi link, accurate data offloading to the Wi-Fi link cannot be ensured. For another example, considering classified charging, the operator may want the UE to transmit as much data on the LTE link as possible. As described in the foregoing example, when the offloading depends on an objective RTT and packet loss rate, a management and control objective of the operator cannot be ensured. Therefore, output of the MPTCP congestion control algorithm may be affected by changing the RTTs and/or the packet loss rates that are on the LTE link and the Wi-Fi link to a particular value. Data is migrated to a corresponding link to satisfy a management and control requirement of the operator.

The foregoing operator policy may be directly configured on the data transmission control node, or may be delivered by another network element, for example, formulated and delivered by a control device in a core network, which is not specially limited in this embodiment of the present invention.

Optionally, the processing unit 301 may be further configured to: determine, according to radio resource statuses of network nodes corresponding to the multiple TCP subflows, a network node on which data transmission control needs to be performed; and select at least one TCP subflow that is corresponding to the network node and on which data is being transmitted.

Optionally, the processing unit 301 may be further configured to: determine whether conditions of communication links in which the multiple TCP subflows are located satisfy a preset condition, and select at least one TCP subflow on which data is being transmitted from TCP subflows that do not satisfy the preset condition.

Optionally, the data transmission control node may further include a receiving unit 303, configured to receive a measurement report reported by the network node, where the measurement report is used to indicate the conditions of the communication links of the multiple TCP subflows and/or the radio resource statuses of the network nodes corresponding to the multiple TCP subflows. The processing unit 301 is specifically configured to select the at least one TCP subflow according to the measurement report.

Specifically, the radio resource status may be obtained by analyzing a measurement report that is reported by the network node for a radio access point, and the measurement report may include a resource status of the radio access point. The condition of the communication link may be obtained by analyzing a measurement report that is reported by the network node for an accessed user, and the measurement report may include air-interface link information of the accessed user.

The accessed user refers to a logical object, in an access network, corresponding to UE that successfully accesses a communications network by using the access network. When UE that serves as one party of the MPTCP connection accesses a communications network and performs actual communication, the UE may be regarded as an accessed user. Specially, it may be considered that one UE that accesses different communications networks and has a TCP subflow in each of the different communications networks is corresponding to different accessed users in the corresponding communications networks, and has respective user identifiers in the corresponding communications networks. For example, if the UE has a radio link in a 3GPP network, the UE is corresponding to an accessed user in the 3GPP network, and the accessed user may be identified in a manner such as an IMSI, a GUTI, or a GCI plus a user identifier in a cell. If the UE has a radio link in a WLAN network, the UE is corresponding to an accessed user in the WLAN network, and the accessed user may be identified in a manner such as a MAC address, an AP ID plus an IP address, an AC ID plus an IP address, or an SSID plus an IP address.

It may be understood that, the foregoing three conditions may be in any combination, or may be independently used as a criterion for selecting a TCP subflow. In addition, selecting a TCP subflow to perform offloading processing is unlimited to the foregoing three conditions, and a proper reference value may be selected as a formulation criterion according to a requirement for running a system, which is not specially limited in this embodiment of the present invention.

Optionally, in another embodiment of the present invention, the data transmission control node may further include an information management unit 304, which may be configured to associate, according to an MPTCP connection message, the multiple TCP subflows that belong to the same MPTCP connection with the MPTCP connection, where the MPTCP connection message is used to indicate a status of the MPTCP connection.

The MPTCP connection message may include an initial MPTCP connection establishment notification message that indicates completion of an initial MPTCP connection establishment process and a TCP subflow creation notification message that indicates that a TCP subflow that belongs to the MPTCP connection is created after an initial MPTCP connection establishment process is completed.

Optionally, the MPTCP connection message may further include an address addition notification message that indicates addition of an available address, may further include a TCP subflow deletion notification message that indicates deletion of one or more currently used TCP subflows, and may further include a TCP subflow priority update notification message that indicates a change of a use priority of a TCP subflow, and the like. Changing a use priority of a TCP subflow means changing a backup state of one or more TCP subflows.

The receiving unit 303 may be further configured to receive the MPTCP connection message reported by the network node, where the MPTCP connection message is obtained by the network node by parsing a TCP data packet that is of an accessed user and carries MPTCP signaling.

Different types of MPTCP connection messages carry information related to a corresponding state of the MPTCP connection.

For example, content carried in the initial MPTCP connection establishment notification message may include but is not limited to the following information:

a radio access type in which a current TCP subflow falls, for example, a 3GPP network or a WLAN network; an identifier of a radio access point in which a current TCP subflow is located, for example, if a radio access type is a 3GPP network, the identifier may be represented by using a global cell identity (GCI), or if a radio access type is a WLAN network, the identifier may be represented by using an AP ID or an AC ID; a globally unique identifier of an accessed user to which a current TCP subflow belongs, for example, an accessed user in a 3GPP network may be identified in a manner such as an IMSI, a GUTI, or a GCI plus a user identifier in a cell, and an accessed user in a WLAN network may be identified in a manner such as a MAC address, an AP ID plus an IP address, an AC ID plus an IP address, or an SSID plus an IP address; address information of a current TCP subflow, where a representation form of this information may be addresses of two parties of the current TCP subflow, that is, an IP address and a port number (port) that are obtained from a packet header of a TCP data packet of an accessed user; and keys of two parties of a current TCP subflow or tokens obtained by calculating the keys.

Content carried in the TCP subflow creation notification message may include but is not limited to the following information:

a radio access type in which a current TCP subflow falls; an identifier of a radio access point in which a current TCP subflow is located; a globally unique identifier of an accessed user to which a current TCP subflow belongs; address information of a current TCP subflow, where a representation form of this information may be addresses of two parties of the current TCP subflow; Address_IDs of two parties of a current TCP subflow; a token of a responder party of a TCP subflow creation process, that is, a token carried in an MP_JOIN option in a TCP SYN packet; a current TCP subflow party that initiates a subflow creation process, where for example, an MPTCP connection is established between a server and UE, and if a network node identifies that the server sends a TCP SYN packet that carries an MP_JOIN option, it indicates that the server initiates the subflow creation process, or if a network node identifies that the UE sends a TCP SYN packet that carries an MP_JOIN option, it indicates that the UE initiates the TCP subflow creation process; and air-interface downlink and uplink backup identifiers of a current TCP subflow, where a backup flag bit is indicated by MPTCP signaling that carries an MP_JOIN option, and indicates whether a transmit party of the MPTCP signaling wants a peer end to use the TCP subflow as a backup when the peer end sends data to the transmit party of the MPTCP signaling. Therefore, the air-interface uplink backup identifier of the current TCP subflow refers to a backup identifier indicated by air-interface downlink signaling that carries the MP_JOIN option in a TCP subflow creation process, and the air-interface downlink backup identifier of the current TCP subflow refers to a backup identifier indicated by air-interface uplink signaling that carries the MP_JOIN option in the TCP subflow creation process. For example, as described above, the server initiates the TCP subflow creation process. The TCP SYN packet that is sent by the server to the UE and carries the MP_JOIN option indicates that a backup flag bit is 1, which means that an air-interface uplink backup flag bit of a TCP subflow is 1, and that the server instructs the UE to regard the created TCP subflow as a backup subflow when the UE subsequently sends data to the server. Similarly, a SYN/ACK message fed back by the UE to the server also carries a backup flag bit that is used to indicate a backup state that is used by the server for the TCP subflow when the server sends data to the UE.

Content carried in the address addition notification message may include but is not limited to the following information: address information that is parsed from an ADD_ADDR option and needs to be added, where the ADD_ADDR option is sent by one party of a current TCP subflow, a form of this address information may be an ADDRESS_ID plus an available address, an ADDRESS_ID plus an IP address and a Port, or an ADDRESS_ID plus an IP address, and the form depends on whether a content format in the ADD_ADDR option carries a Port; address information of a current TCP subflow, where a representation form of this information may be addresses of two parties of a current TCP subflow; and a party, of an MPTCP connection to which a current TCP subflow belongs, to which an available address needs to be added, where for example, an MPTCP connection is established between a server and UE, and if a network node identifies that the server sends an ADD_ADDR option, it indicates that an available address needs to be added to the server.

The TCP subflow deletion notification message may carry different information content according to different methods for determining, by a network node, completion of an MPTCP subflow deletion process.

For example, if completion of the MPTCP subflow deletion process is determined by obtaining and parsing a TCP RST packet or a TCP FIN packet, content carried in the TCP subflow deletion notification message may include but is not limited to the following information: address information of a current TCP subflow, that is, a TCP subflow that carries the TCP RST packet or the TCP FIN packet, where a representation form of this information may be addresses of two parties of the current TCP subflow.

For example, if completion of the MPTCP subflow deletion process is determined by obtaining and parsing a REMOVE_ADDR option of a TCP data packet, content carried in the TCP subflow deletion notification message may include but is not limited to the following information: a set of ADDRESS_IDs that are parsed from the REMOVE_ADDR option and need to be deleted; address information of a current TCP subflow, that is, a TCP subflow that carries the REMOVE_ADDR option, where a representation form of this information may be addresses of two parties of the current TCP subflow; and a party, of an MPTCP connection to which a current TCP subflow belongs, from which an address needs to be deleted, where for example, an MPTCP connection is established between a server and UE, and if a network node identifies that the server sends the REMOVE_ADDR option, it indicates that an available address needs to be deleted from the server.

The TCP subflow priority update notification message may carry different information content according to a completion status that is of an MPTCP subflow priority update process and is determined by a network node according to an MP_PRIO option in a TCP data packet of an accessed user.

Case 1: If the MP_PRIO option does not carry an ADDRESS_ID, it indicates that a priority of a current TCP subflow, that is, a subflow that carries the MP_PRIO option, needs to be changed. In this case, content carried in the TCP subflow priority update notification message may include but is not limited to the following information: address information of a current TCP subflow; information that indicates a priority update direction of a subflow, where a representation form of this information may be indicating an MP_PRIO option sent by a party of a current TCP subflow, or may be directly indicating whether an air-interface downlink backup identifier or an air-interface uplink backup identifier needs to be updated; and a backup flag bit value that is parsed from the MP_PRIO option. For example, if a server sends the MP_PRIO option, it indicates that the uplink backup identifier needs to be updated, and the updated uplink backup identifier is used to indicate whether the server instructs UE to use a current TCP subflow as a backup subflow when the UE subsequently sends data to the server. If UE sends the MP_PRIO option, it indicates that the downlink backup identifier needs to be updated, and the updated downlink backup identifier is used to indicate whether the UE instructs a server to use a current TCP subflow as a backup subflow when the server subsequently sends data to the UE.

Case 2: If the MP_PRIO option carries an ADDRESS_ID, it indicates that priority update is applied to all TCP subflows in an MPTCP connection that use an address corresponding to the ADDRESS_ID. In this case, content carried in the TCP subflow priority update notification message may include but is not limited to the following information: address information of a current TCP subflow, that is, a TCP subflow that carries an MP_PRIO option, where a representation form of this information may be addresses of two parties of the current TCP subflow; the ADDRESS_ID parsed from the MP_PRIO option; information that indicates a priority update direction of a subflow, where a representation form of this information may be indicating the MP_PRIO option sent by a party of a current TCP subflow, or may be directly indicating whether an air-interface downlink backup identifier or an air-interface uplink backup identifier needs to be updated; and a backup flag bit value that is parsed from the MP_PRIO option. A specific process is similar to that in Case 1, and details are not described herein again.

It should be understood that, types of air-interface links that carry TCP subflows may be the same, or may be different. It is assumed that an MPTCP connection includes two TCP subflows, and then both of the TCP subflows may be established on an LTE link; or one TCP subflow is established on an LTE link, and the other TCP subflow is established on a Wi-Fi link. A quantity of TCP subflows included in a same MPTCP connection and a link type are not specially limited in this embodiment of the present invention, and may be determined according to an actual network operation requirement.

Optionally, the receiving unit 303 may receive MPTCP messages that are reported by multiple types of network nodes and are of multiple TCP subflows that belong to a same MPTCP connection, for example, simultaneously receive an MPTCP message that is reported by a BTS, a NodeB, and an AP and is of at least one TCP subflow that passes the network node. Optionally, the network node may be a base station device, and then a communication link may be established between a base station control device that manages different network nodes and the data transmission control node, and is used to transmit measurement information and control information. For example, if the data transmission control node is integrated in an RNC, the NodeB may directly report, to the RNC, an MPTCP connection message parsed by the NodeB. The BTS or the AP may report an MPTCP connection message obtained by the BTS or the AP to a corresponding BSC or AC, the BSC or the AC forward the received MPTCP connection message to the foregoing RNC according to a link relationship between the foregoing RNC and either of the BSC and the AC, and the RNC completes management of the MPTCP connection. Optionally, a communication link may be directly established between each network node and the data transmission control node, and each network node may directly report a related message to the data transmission control node without the need of forwarding by a related control device. In addition, if a network node and the data transmission control node are integrated in one network device, for example, integrated in an e-NodeB, similar to the foregoing scenario, a communication link needs to be established only between the e-NodeB and another network device whose level is corresponding to that of the e-NodeB, so as to perform information exchange. Details are not described herein.

Figure 4:
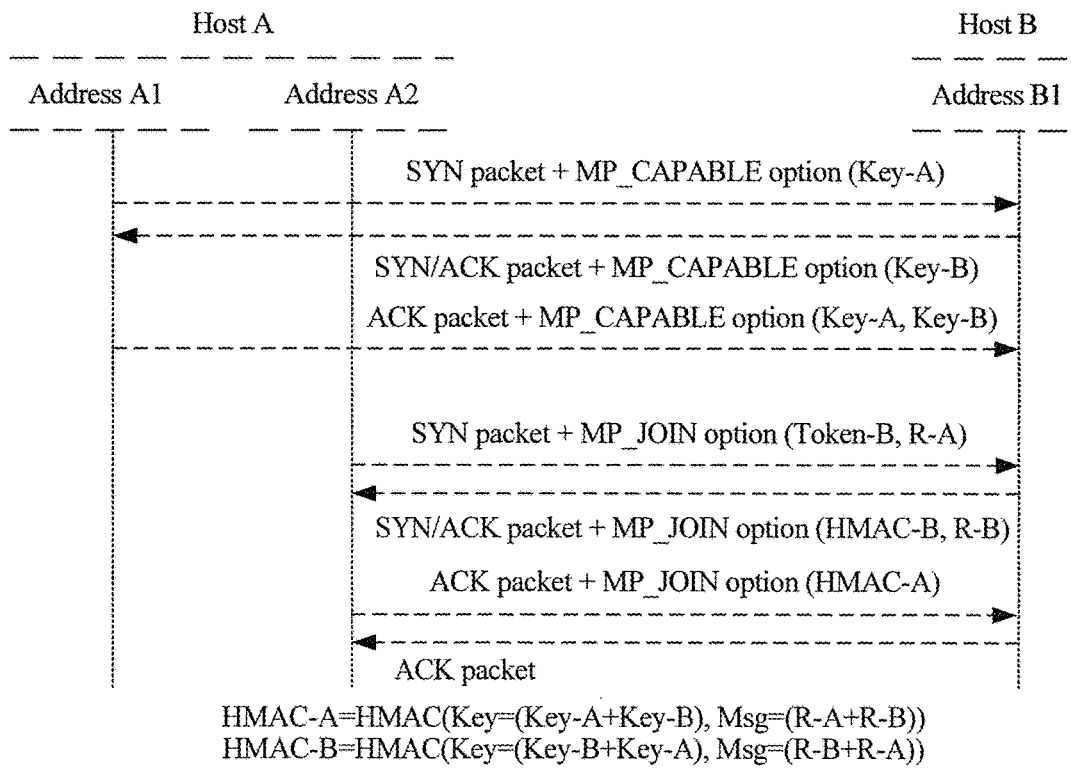
FIG. 4 is a schematic signaling flowchart of an initial MPTCP connection establishment process and a TCP subflow creation process.

FIG. 4 is a signaling flowchart of an initial MPTCP connection establishment process and a TCP subflow creation process. The initial MPTCP connection establishment process includes establishing a first TCP subflow that belongs to the MPTCP connection, and establishing the MPTCP connection by using three handshake processes. Different from establishment of an ordinary TCP connection, a TCP SYN packet, a SYN/ACK packet, and an ACK packet each carry an MP-CAPABLE option, and the option carries a 64-bit key value (Key).

After the initial MPTCP connection establishment process is completed, any party of the MPTCP connection may create a TCP subflow by using a pair of addresses that are currently unused. As shown in FIG. 4, a TCP subflow A2↔B1 is created between a Host A and a Host B. A2 is an available address of the Host A, and B1 is an available address of the Host B. An MP_JOIN option is carried in the TCP subflow creation process to complete last four steps of the signaling exchange process in FIG. 4. An MP_JOIN option carried in the TCP SYN packet includes a 32-bit token, a 32-bit random number, an ADDRESS_ID, and a backup identifier. A Token-B is a 32-bit value generated after an initiator party of the TCP subflow creation process performs an encryption algorithm, for example, a hash algorithm, by using a 64-bit key value of a responder party. The initiator party of the TCP subflow creation process identifies, by carrying this parameter in the TCP SYN packet, an MPTCP connection that the TCP subflow expects to join. A 32-bit random number R-A carried in the TCP SYN packet by the initiator party of the TCP subflow creation process and a 32-bit random number R-B carried in the SYN/ACK packet by the responder party of the TCP subflow creation process are used to further ensure security of the subflow creation process. The ADDRESS_ID has only local meanings, and has uniqueness. An ADDRESS_ID carried in the TCP SYN packet by the initiator party of the TCP subflow creation process is used to identify an IP address used by the initiator party in a currently created TCP subflow, and an ADDRESS_ID carried in the SYN/ACK packet by the responder party of the TCP subflow creation process is used to identify an IP address used by the responder party in the currently created subflow. A backup flag bit is used to indicate whether a transmit party of the information of MP_JOIN option wants a peer end to use the TCP subflow as a backup. The transmit party requests, by setting the backup flag bit to 1, the peer end to send data on this backup subflow whose backup flag bit is 1 only when there is no available subflow, that is, a subflow whose backup flag bit is 0. For example, a backup flag bit carried in the TCP SYN packet by the initiator party Host A of the TCP subflow in FIG. 4 is used to indicate whether the Host A wants the Host B to use the TCP subflow as a backup, and a backup flag bit carried in the SYN/ACK packet by the responder party Host B of the TCP subflow in the figure is used to indicate whether the Host B wants the Host A to use the TCP subflow as a backup.

Optionally, the data transmission control node may simultaneously manage multiple MPTCP connections, and no limitation is imposed on items such as device types of two communication parties of each of the multiple MPTCP connections, types of communication links in which TCP subflows included in the MPTCP connections are located, and a type of a radio access point accessed by UE.

Optionally, in another embodiment of the present invention, the information management unit 304 may further include a storage subunit 3011, configured to store and update an MPTCP connection information table, and the MPTCP connection information table includes MPTCP connection information carried in the MPTCP connection message reported by the network node.

Specifically, the information management unit 304 parses out related MPTCP connection information carried in received various types of MPTCP connection messages, and arranges the MPTCP connection information into the MPTCP connection information table. The MPTCP connection information includes information such as accessed user information or radio access point information that is related to a current MPTCP connection status.

Optionally, the MPTCP connection information table may include MPTCP connection information that is reported by different network nodes and is about a same MPTCP connection, or may include MPTCP connection information that is reported by different network nodes and is about different MPTCP connections. The information management unit 304 may use an MPTCP connection as a classification criterion to perform management on all TCP subflows.

Optionally, if receiving the initial MPTCP connection establishment notification message (hereinafter referred to as a "notification message 1"), the information management unit 304 may maintain the MPTCP connection information table by using the following operations:

If the notification message 1 carries key values of two parties of a TCP subflow (which is referred to as a "current TCP subflow" in this paragraph) established in an initial MPTCP connection establishment process, the data transmission control node may obtain tokens after calculating the foregoing key values and store the tokens into MPTCP connection information (which is referred to as "current MPTCP connection information" in this paragraph) related to the current TCP subflow. If the notification message 1 carries tokens of the two parties of the current TCP subflow, the data transmission control node directly stores the tokens into the current MPTCP connection information; stores, into the current MPTCP connection information, information such as a radio access type in which the current TCP subflow falls, an identifier of a radio access point in which the current TCP subflow is located, or a globally unique identifier of a radio accessed user to which the current TCP subflow belongs, where the information is carried in the notification message 1; stores, into the current MPTCP connection information, address information that is of the current TCP subflow and is carried in the notification message 1; sets air-interface downlink and uplink backup flag bits of the current TCP subflow of the current MPTCP connection to 0; and sets ADDRESS_IDs corresponding to addresses of the two parties of the current TCP subflow to 0.

Optionally, if receiving the TCP subflow creation notification message (hereinafter referred to as a "notification message 2"), the information management unit 304 may maintain the MPTCP connection information table by using the following operations:

associating a TCP subflow established in a TCP subflow creation process with a corresponding MPTCP connection; storing, into MPTCP connection information corresponding to an MPTCP connection to which the created TCP subflow belongs, a radio access type in which the created TCP subflow falls, an identifier of a radio access point in which the created TCP subflow is located, and a globally unique identifier of a radio accessed user to which the created TCP subflow belongs, where the radio access type, the identifier of the radio access point, and the globally unique identifier of the radio accessed user are carried in the notification message 2; storing address information of the created TCP subflow and air-interface downlink and uplink backup identifiers of the created TCP subflow into the foregoing corresponding MPTCP connection information, where the address information and the backup identifiers are carried in the notification message 2; and storing addresses of the two parties of the created TCP subflow and corresponding ADDRESS_IDs into available address information of two communication parties of the MPTCP connection to which the created TCP subflow belongs, where the addresses and the ADDRESS_IDs are carried in the notification message 2.

Optionally, if receiving the address addition notification message, the information management unit 304 may maintain the MPTCP connection information table by using the following operations: finding, according to address information of a current TCP subflow, an MPTCP connection to which the current TCP subflow belongs, and storing added available address information into the MPTCP connection to which the current TCP subflow belongs.

Optionally, if receiving the TCP subflow deletion notification message (hereinafter referred to as a "notification message 3"), the information management unit 304 may maintain the MPTCP connection information table by using the following operations:

if the notification message 3 carries address information of a current TCP subflow, that is, a TCP subflow that sends a REMOVE_ADDR option, and the notification message 3 does not carry an ADDRRESS_ID, finding, according to the address information of the current TCP subflow, an MPTCP connection to which the current TCP subflow belongs, and deleting related information of the TCP subflow from the MPTCP connection to which the current TCP subflow belongs; or if the message carries information such as a set of ADDRRESS_IDs that need to be deleted, address information of a current TCP subflow, or a current TCP subflow party from which an address needs to be deleted, finding, according to the foregoing address information, an MPTCP connection to which the current TCP subflow belongs; deleting, according to a party, of the MPTCP connection to which the current TCP subflow belongs, from which an address needs to be deleted and the set of ADDRESS_IDs that need to be deleted, available addresses of two parties of the MPTCP connection to which the current TCP subflow belongs; and deleting related information of all TCP subflows that use addresses corresponding to the foregoing ADDRESS_IDs from the MPTCP connection to which the current TCP subflow belongs.

Optionally, if receiving the TCP subflow priority update notification message (hereinafter referred to as a "notification message 4"), the information management unit 304 may maintain the MPTCP connection information table by using the following operations:

if the notification message 4 carries address information of a current TCP subflow, information that indicates a subflow priority update direction, and a backup identifier, finding, according to the address information of the current TCP subflow, an MPTCP connection to which the current TCP subflow belongs, and refreshing an air-interface downlink or uplink backup identifier of a to-be-updated subflow in the MPTCP connection.

The foregoing refreshing a downlink or uplink backup identifier of a to-be-updated subflow in the MPTCP connection to which the current TCP current belongs includes: determining, according to a subflow priority update direction, an ADDRESS_ID, and the backup identifier that are in the notification message 4, a TCP subflow, in the MPTCP connection to which the current TCP subflow belongs, whose priority needs to be updated, and an update manner. For example, if an indication of the subflow priority update direction is represented as an MP_PRIO option sent by a transmit party, for example, a server, of air-interface downlink data, information about all TCP subflows included in the MPTCP connection to which the current TCP subflow belongs is searched. If it is found that an address of a party of a TCP subflow matches the ADDRESS_ID, the backup identifier in the notification message 4 is used to refresh an air-interface uplink backup identifier of this TCP subflow.

Optionally, whether a TCP subflow is a backup subflow may be identified based on an MP_PRIO option, or the data transmission control node may identify a backup subflow by monitoring a data stream. If a network node finds that there is no data on a TCP subflow that is of an MPTCP user and passes the network node in a time period of an air-interface downlink or uplink, a backup identifier of this TCP subflow in an air-interface downlink or uplink direction may be considered as 1. The information management unit 304 may execute the step.

The information management unit 304 may further include a TCP subflow association subunit 3012, which may be configured to: after receiving the TCP subflow creation notification message reported by the network node, associate a created TCP subflow that belongs to an MPTCP connection with the MPTCP connection.

Specifically, the association process includes: parsing the TCP subflow creation notification message, determining a party that is of two communication parties of the MPTCP connection and is an initiator party of the TCP subflow creation process, obtaining an address of the current TCP subflow and tokens of two parties of the subflow creation process, further determining that the other party of the two communication parties of the foregoing MPTCP connection is a responder party of the TCP subflow creation process, obtaining an address of the responder party, and searching an MPTCP connection information table. If it is found that a token of the responder party of the TCP subflow creation process is equal to a token of a party of an MPTCP connection, and that the address of the responder party of the TCP subflow creation process is equal to an address in an available address set of a party of the MPTCP connection, the created TCP subflow belongs to the MPTCP connection. The available address set includes at least one available address used to establish a TCP subflow.

Optionally, if before the MPTCP connection information table is searched, it is determined that the responder party of the TCP subflow creation process is a party of the two communication parties of the MPTCP connection, and an address of the party is obtained, when MPTCP connection information is being searched, MPTCP connection information related only to the responder party may be searched for without searching for a peer end, which saves system calculation resources, and improves searching efficiency.

Optionally, in a scenario in which for the two communication parties of the MPTCP connection, one party has multiple addresses, the other party has a single address, or both parties have multiple addresses, after an initial MPTCP establishment process is completed, a multi-address party may initiate an address addition notification process to a peer end to notify the peer end of an available address of the multi-address party. The address addition notification message reported by the network node to the data transmission control node includes a party that is of the MPTCP connection and to which an available address needs to be added, information about the address that needs to be added, and an ADDRESS_ID corresponding to the address. Optionally, a single-address party of the MPTCP connection may initiate a TCP subflow creation process according to a known available address of a peer end.

The TCP subflow association subunit 3012 may perform the foregoing processing process on each created TCP subflow managed by the data transmission control node, and may associate multiple TCP subflows that belong to a same MPTCP connection with the MPTCP connection, including associating the foregoing created TCP subflow with an MPTCP connection to which the TCP subflow belongs.

Optionally, in a scenario, an IP address of one party of an MPTCP connection is in conflict, and the address conflict herein means that IP addresses of communications nodes in different subnetworks are the same. For example, a Host A and a Host A' respectively belong to different networks: a WLAN A and a WLAN A', and the networks WLAN A and WLAN A' respectively allocate private IP addresses to the Host A and the Host A'. As a result, IP addresses of the Host A and the Host A' may be the same, and such a case is referred to as the address conflict. Because the data transmission control node may be simultaneously connected to the networks WLAN A and WLAN A', captured IP addresses of the Host A and the Host A' in the networks WLAN A and WLAN A' may be the same. In this case, to differentiate MPTCP connections in the data transmission control node, the information management unit 304 may be configured to receive an MPTCP connection message that is reported by the network node and carries a network indicator, where the network indicator may include an access point name (APN), an identifier of a radio access point, and the like. During a retrieval operation performed on an MPTCP connection according to an address, if multiple MPTCP information records are retrieved for a same IP address, match retrieval may be performed by using the foregoing network indicator.

Management and control on data transmitted on an MPTCP connection is performed on a premise that TCP subflows that belong to a same MPTCP connection are associated with the MPTCP connection. That is, information needs to be cleared, such as an MPTCP connection to which a TCP subflow that may be used by current UE for data communication belongs or a network node accessed by the TCP subflow, and a status of the TCP subflow needs to be confirmed, so that congestion control can be performed on different TCP subflows that belong to a same MPTCP connection, which includes data offloading between the different TCP subflows to obtain an expected offloading result.

Figure 5:
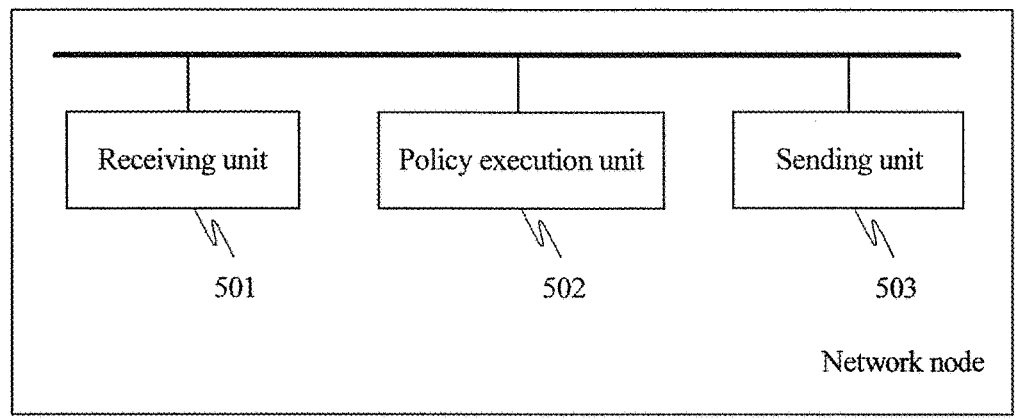
FIG. 5 is a schematic block diagram of a data transmission control node according to an embodiment of the present invention.

An embodiment of the present invention provides a network node, configured to control data transmission between two communication parties of a Multipath Transmission Control Protocol MPTCP connection, where the MPTCP connection includes multiple Transmission Control Protocol TCP subflows, and the network node is located in a communication link between the two communication parties. A structure is shown in FIG. 5 and the network node includes a receiving unit 501 and a policy execution unit 502.

The receiving unit 501 is configured to receive information about at least one TCP subflow selected by a data transmission control node from the multiple TCP subflows.

The receiving unit 501 is further configured to receive an adjustment policy indicated by the data transmission control node, where the adjustment policy is an adjustment policy for an input item of an MPTCP congestion control algorithm.

Optionally, the input item of the MPTCP congestion control algorithm includes a data round trip time RTT and/or a packet loss rate that are/is of the at least one TCP subflow.

The policy execution unit 502 is configured to: adjust a data transmission process on the at least one TCP subflow according to the foregoing adjustment policy, and trigger the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

Optionally, the network node further includes a sending unit 503, configured to send an adjusted input item to the two communication parties, where the adjusted input item is obtained after the policy execution unit adjusts the data transmission process on the at least one TCP subflow, and is used to trigger the two communication parties to perform the MPTCP congestion control algorithm.

The adjustment policy for the input item of the MPTCP congestion control algorithm includes reducing a data transmission rate of the at least one TCP subflow, and includes a reduction degree of the data transmission rate.

Optionally, that the policy execution unit 502 is configured to adjust a data transmission process on the at least one TCP subflow includes: delaying sending a data packet on the at least one TCP subflow to increase the RTT, where a delay time is corresponding to the reduction degree of the data transmission rate.

Optionally, that the policy execution unit 502 may be further configured to discard a service data packet on the at least one TCP subflow to increase the packet loss rate, where a quantity of discarded service data packets is corresponding to the reduction degree of the data transmission rate.

In another embodiment, the two communication parties may detect by themselves input items of the algorithm, such as the RTT and the packet loss rate, which is not specially limited in this embodiment of the present invention.

Optionally, the sending unit 503 may be further configured to report a measurement report to the data transmission control node, where the measurement report is used to indicate conditions of communication links of the multiple TCP subflows and/or radio resource statuses of network nodes corresponding to the multiple TCP subflows, and the measurement report is used by the data transmission control node to select the at least one TCP subflow.

Optionally, the measurement report may be a measurement report for a network node accessed by UE, and reported content may be but is not limited to the following information: a radio access type, an identifier of a radio access point, and a resource status of a radio access point, for example, system load information.

Optionally, the measurement report may be a measurement report for an accessed user, and reported content may be but is not limited to the following information: a radio access type, an identifier of a radio access point, a globally unique identifier of the accessed user, and air-interface link information of UE, for example, link quality and user distribution, for example, whether a user is a cell-center user or a cell-edge user.

Optionally, the measurement report for the network node may be reported only when a TCP subflow related to an MPTCP connection occurs at the network node, or the measurement report for the accessed user may be reported only when the accessed user has a TCP subflow related to an MPTCP connection, which may reduce a reporting frequency of a measurement report.

Optionally, in a scenario in which UE stably exists in a network node, a manner of reporting a measurement report may be periodically reporting or event triggered reporting, and the event-triggered-reporting includes but is not limited to the following manners: reporting the measurement report when a measurement quantity changes; or reporting the measurement report only when a measurement quantity satisfies a condition, for example, load of a radio access point exceeds a threshold; or reporting a measurement result according to a measurement reporting request message after the request message sent by the data transmission control node is received.

Optionally, if a network node of UE is switched, a process for generating and reporting a measurement report may include the following:

After finding that a user is successfully switched, a source radio access point reports an access switching notification message to the data transmission control node, and carried content may include but is not limited to the following information: a globally unique user identifier of the switched accessed user, a radio access point type, an identifier of the source radio access point, an identifier of a target radio access point.

After finding that the accessed user is successfully switched, the target radio access point reports a measurement report for this accessed user to the data transmission control node in the manner described in the foregoing related embodiment.

After receiving the access switching notification message, the information management unit 304 of the data transmission control node changes, from source radio access point information to target radio access point information, radio access point information that is in an MPTCP connection information table and is of all TCP subflows of this accessed user of this source radio access point.

Optionally, in another embodiment of the present invention, the sending unit 501 may be further configured to report an MPTCP connection message to the data transmission control node, where the MPTCP connection message is used to indicate a status of the MPTCP connection, the MPTCP connection message carries MPTCP connection information, and the MPTCP connection information is used by the data transmission control node to associate the multiple TCP subflows with the MPTCP connection, so that the MPTCP connection includes the multiple TCP subflows.

Optionally, the sending unit 501 may further include a user identification subunit 5011, configured to: identify an MPTCP connection status of an accessed user, and generate an MPTCP connection message corresponding to the MPTCP connection status.

Specifically, the user identification subunit 5011 may be specifically configured to: parse a TCP data packet that is of an accessed user and carries MPTCP signaling; identify, by using a special field in the data packet, an accessed user that is an MPTCP user; and obtain an MPTCP connection message of the accessed user. Specifically, the user identification subunit 5011 may obtain related signaling of an MPTCP connection of the accessed user, parse the signaling, and form a corresponding MPTCP connection message by using a result of the parsing. The MPTCP connection message is used to indicate a status of the MPTCP connection.

Optionally, the user identification subunit 5011 parses a TCP data packet that is of a current accessed user and carries MPTCP signaling. If it is found that the accessed user completes an initial MPTCP connection establishment process, the sending unit 501 reports an initial MPTCP connection establishment notification message to the data transmission control node.

The network node may determine completion of the initial MPTCP connection establishment process by using the following method: The network node obtains and parses an acknowledgement message (ACK) that carries an MP_CAPABLE option, or the network node obtains and parses a three-step handshake process that carries an MP_CAPABLE option, that is, sequentially captures a TCP SYN packet that carries the MP_CAPABLE option, a SYN/ACK packet that is corresponding to the TCP SYN packet and carries the MP_CAPABLE option, and an ACK that is corresponding to the SYN/ACK packet and carries the MP_CAPABLE option. The determining procedure may be performed by the user identification subunit 5011.

Optionally, the user identification subunit 5011 parses a TCP data packet that is of a current accessed user and carries MPTCP signaling. If it is found that the accessed user completes an MPTCP connection address addition notification process, the sending unit 501 reports the address addition notification message to the data transmission control node.

A method for determining, by the network node, completion of the MPTCP connection address addition notification process may be obtaining the TCP data packet of the accessed user, and parsing out an ADD_ADDR option in the TCP data packet. The determining procedure may be performed by the user identification subunit 5011.

Optionally, the user identification subunit 5011 parses a TCP data packet that is of a current accessed user and carries MPTCP signaling. If it is found that a user completes an MPTCP subflow creation process, the sending unit 501 reports the TCP subflow creation notification message to the data transmission control node.

A method for determining, by the network node, completion of the MPTCP subflow creation process may be sequentially obtaining and parsing a TCP SYN packet that carries an MP_JOIN option and an ACK message corresponding to the TCP SYN packet; or may be obtaining and parsing a four-step handshake process that carries an MP_JOIN option, that is, sequentially capturing a TCP SYN packet that carries the MP_JOIN option, a SYN/ACK packet that is corresponding to the TCP SYN packet and carries the MP_JOIN option, ACK that is corresponding to the SYN/ACK packet and carries the MP_JOIN option, and ACK corresponding to the ACK that carries the MP_JOIN option. The determining procedure may be performed by the user identification subunit 5011.

Optionally, the user identification subunit 5011 parses a TCP data packet of a current accessed user. If it is found that an accessed user completes an MPTCP subflow deletion process, the sending unit 501 reports a TCP subflow deletion notification message to the data transmission control node.

A method for determining, by the network node, completion of the MPTCP subflow deletion process may be obtaining and parsing a TCP RST packet, or may be obtaining and parsing a TCP FIN packet, or may be obtaining and parsing a REMOVE_ADDR option in the TCP data packet.

Optionally, the user identification subunit 5011 parses a TCP data packet that is of a current accessed user and carries MPTCP signaling. If it is found that an accessed user completes an MPTCP subflow priority update process, the sending unit 501 reports a TCP subflow priority update notification message to the data transmission control node.

A method for determining, by the network node, completion of the MPTCP subflow priority update process may be obtaining and parsing an MP_PRIO option included in the TCP data packet of the accessed user.

It should be noted that, for specific content carried in the foregoing types of notification messages related to the MPTCP connection, reference may be made to related descriptions in the embodiment shown in FIG. 3, and details are not described herein again.

By using the data transmission control node and the network node that are provided in this embodiment of the present invention, a TCP subflow on which data offloading needs to be performed is selected according to a requirement for running a system, and an adjustment policy is determined. By changing an input item of an MPTCP congestion control algorithm, data on the selected TCP subflow can be migrated to another expected TCP subflow that belongs to a same MPTCP connection as the selected TCP subflow. The adjustment policy includes satisfying a management and control policy of an operator, and reflecting a congestion status of a data transmission link that carries a TCP subflow, a radio resource status, and the link. By taking an additional measure to manage and control MPTCP data transmission on an access network side, a result of the data offloading can satisfy the expected requirement for running the system, so as to optimize system performance, and improve practicability of the MPTCP congestion control algorithm. In addition, instead of changing a congestion control algorithm in an existing protocol, input of the algorithm is changed to indirectly affect output of the algorithm, so as to obtain an expected data offloading result. The procedure is simple and easy for implementation.

Figure 6:
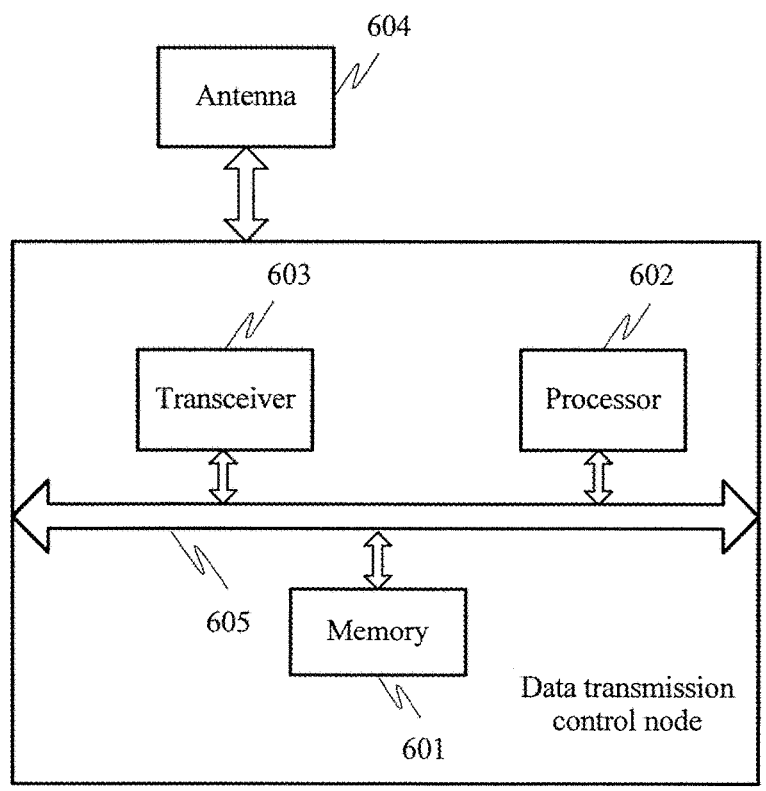
FIG. 6 is a schematic block diagram of another data transmission control node according to an embodiment of the present invention.

FIG. 6 is a schematic block diagram of a data transmission control node according to another embodiment of the present invention. The data transmission control node is configured to control data transmission between two communication parties of an MPTCP connection, and the MPTCP connection includes multiple Transmission Control Protocol TCP subflows. The data transmission control node includes a memory 601, a processor 602, and a transceiver 603.

The memory 601 stores an instruction for the processor 602 to execute the following operations:

selecting at least one TCP subflow on which data transmission control needs to be performed from the multiple TCP subflows; determining an adjustment policy for an input item of an MPTCP congestion control algorithm; and instructing a network node corresponding to the at least one TCP subflow to adjust a data transmission process on the at least one TCP subflow according to the adjustment policy, and trigger the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

The transceiver 603 may be configured to send the adjustment policy to the network node corresponding to the at least one TCP subflow.

A process for sending the foregoing adjustment policy includes traversing an air-interface downlink or uplink management and control subflow set, and delivering the adjustment policy to a network node in which each TCP subflow in the management and control subflow set is located.

Optionally, there may be multiple ways to determine to select a TCP subflow on which air-interface downlink or uplink data is to be migrated to another TCP subflow that belongs to the same MPTCP connection, which is not specially limited in this embodiment of the present invention. For specific content, reference may be made to related descriptions in the embodiment shown in FIG. 3, and details are not described herein again.

Optionally, the memory 601 may further store an instruction for the processor 602 to execute the following operation: determining to reduce a data transmission rate of the at least one TCP subflow, and determining a reduction degree of the data transmission rate.

Specifically, when a speed of a TCP subflow that is being used by the two communication parties is reduced to an extent, the TCP subflow does not satisfy a performance requirement for data transmission. The two communication parties may detect by themselves rate information of the TCP subflow or obtain rate information of the TCP subflow from a network node, enable the MPTCP congestion control algorithm, and switch the TCP subflow. For specific content, reference may be made to related descriptions in the embodiment shown in FIG. 3, and details are not described herein again.

Optionally, the memory 601 may further store an instruction for the processor 602 to execute the following operation: instructing the network node to delay sending a data packet on the at least one TCP subflow to increase an RTT, where a delay time is corresponding to the reduction degree of the data transmission rate.

Optionally, the memory 601 may further store an instruction for the processor 602 to execute the following operation: instructing the network node to discard a service data packet on the at least one TCP subflow to increase a packet loss rate, where a quantity of discarded service data packets is corresponding to the reduction degree of the data transmission rate.

The foregoing processes for changing the RTT and the packet loss rate may be simultaneously performed, that is, the data transmission rate of the TCP subflow is changed by comprehensively using the RTT and the packet loss rate; or may be separately performed, which is not specially limited in this embodiment of the present invention.

A round trip time and/or a packet loss rate of a TCP layer are/is changed, and an adjusted RTT and/or packet loss rate are/is used as the input item of the MPTCP congestion control algorithm to affect the output result of the algorithm, so that data on all TCP subflows can complete a migration process that satisfies an expected requirement.

For a specific method for changing the packet loss rate or the RTT, reference may be made to related descriptions in the embodiment shown in FIG. 3, and details are not described herein again.

Optionally, the memory 601 may further store an instruction for the processor 602 to execute the following operation: selecting the TCP subflow according to at least one condition in a management and control policy of an operator, a condition of a communication link, or radio resource statuses of network nodes corresponding to the TCP subflows of the MPTCP connection. For a specific determining manner and process, reference may be made to related descriptions in the embodiment shown in FIG. 3, and details are not described herein again.

Optionally, the transceiver 603 may be further configured to: receive a measurement report reported by the network node, and obtain conditions of communication links of the TCP subflows and/or the radio resource statuses of the network nodes corresponding to the TCP subflows. For specific content in the measurement report, reference may be made to related descriptions in the embodiment shown in FIG. 3, and details are not described herein again.

Optionally, in another embodiment of the present invention, the memory 601 may further store an instruction for the processor 602 to execute the following operation: associating, according to an MPTCP connection message, the multiple TCP subflows that belong to the same MPTCP connection with the MPTCP connection, where the MPTCP connection message is used to indicate a status of the MPTCP connection.

The MPTCP connection message may include an initial MPTCP connection establishment notification message that indicates completion of an initial MPTCP connection establishment process and a TCP subflow creation notification message that indicates that a TCP subflow that belongs to the MPTCP connection is created after an initial MPTCP connection establishment process is completed.

Optionally, the MPTCP connection message may further include an address addition notification message that indicates addition of an available address, may further include a TCP subflow deletion notification message that indicates deletion of one or more currently used TCP subflows, and may further include a TCP subflow priority update notification message that indicates a change of a use priority of a TCP subflow, and the like. Changing a use priority of a TCP subflow means changing a backup state of one or more TCP subflows.

Optionally, the MPTCP connection message may further include a TCP subflow deletion notification message that indicates deletion of a currently used TCP subflow, a TCP subflow priority update notification message that indicates a change of a use priority of a TCP subflow, and the like. Changing a use priority of a TCP subflow means changing a backup state of a currently used TCP subflow.

Optionally, the data transmission control node may receive MPTCP messages that are reported by multiple types of network nodes and are of multiple TCP subflows that belong to a same MPTCP connection, for example, simultaneously receive MPTCP information that is reported by a BTS, a NodeB, and an AP and is of at least one TCP subflow that passes the network node. For a specific reporting manner, reference may be made to related content in the embodiment shown in FIG. 3, and details are not described herein again.

The memory 601 may further store an instruction for the processor 602 to execute the following operations:

storing and updating an MPTCP connection information table, where the MPTCP connection information table includes MPTCP connection information carried by the MPTCP connection message reported by the network node.

Optionally, the MPTCP connection information table may include MPTCP connection messages that are reported by different network nodes and are about a same MPTCP connection, or may include MPTCP connection messages that are reported by different network nodes and are about different MPTCP connections. An MPTCP connection may be used as a classification criterion to perform management on all TCP subflows.

Optionally, when receiving MPTCP connection messages that include different content, the data transmission control node may correspondingly maintain the foregoing MPTCP connection information table. For specific maintenance processes corresponding to the MPTCP connection messages that include different content, reference may be made to related descriptions in the embodiment shown in FIG. 3, and details are not described herein again.

Each TCP subflow may be associated with an MPTCP connection by looking up the foregoing MPTCP connection information table and by matching information in the table. For a specific association process, reference may be made to related descriptions in the embodiment shown in FIG. 3, and details are not described herein again.

In addition, the data transmission control node may further include an antenna 604, a bus system 605, and the like. The processor 602 controls an operation of the data transmission control node, and the processor 602 may also be referred to as a CPU (central processing unit). The memory 601 may include a read-only memory and a random access memory, and provide an instruction and data for the processor 602. A part of the memory 601 may further include a nonvolatile random access memory (NVRAM). In specific application, the transceiver 603 may be coupled to the antenna 604. All components of the data transmission control node are coupled together by using the bus system 605. In addition to a data bus, the bus system 605 may further include a power bus, a control bus, a status signal bus, and the like. However, for clear description, various types of buses in the figure are marked as the bus system 605.

Figure 7:
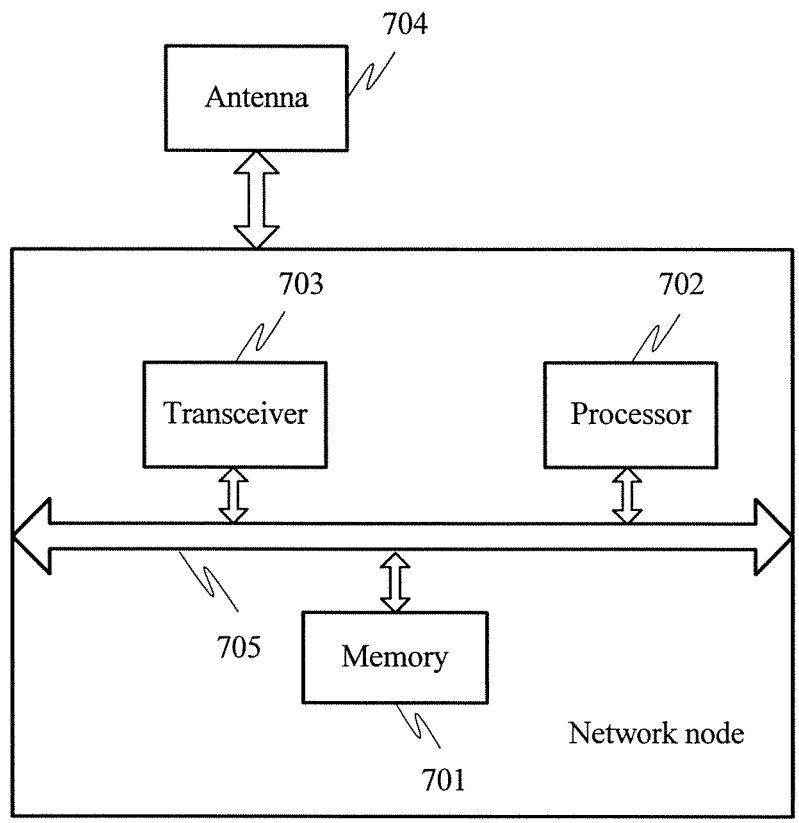
FIG. 7 is a schematic block diagram of a network node according to an embodiment of the present invention.

FIG. 7 is a schematic block diagram of a network node according to an embodiment of the present invention. The network node includes a memory 701, a processor 702, and a transceiver 703.

The transceiver 703 is configured to: receive information about at least one TCP subflow selected by a data transmission control node from the multiple TCP subflows, and receive an adjustment policy indicated by the data transmission control node, where the adjustment policy is an adjustment policy for an input item of an MPTCP congestion control algorithm.

Optionally, the input item of the MPTCP congestion control algorithm includes a data round trip time RTT and/or a packet loss rate that are/is of the at least one TCP subflow.

The memory 701 may store an instruction for the processor 702 to execute the following operations:

adjusting a data transmission process on the at least one TCP subflow according to the foregoing adjustment policy sent by the data transmission control node, and triggering the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

Optionally, the memory 701 may further store an instruction for the processor 702 to execute the following operation: determining to reduce a data transmission rate of the at least one TCP subflow, and determining a reduction degree of the data transmission rate.

Optionally, the memory 701 may further store an instruction for the processor 702 to execute the following operation: discarding a service data packet on the at least one TCP subflow to increase the packet loss rate, where a quantity of discarded service data packets is corresponding to the reduction degree of the data transmission rate.

A data transmission rate of a particular TCP subflow may be reduced by changing an RTT and/or a packet loss rate, which triggers the two communication parties to change a data transmission path. Data transmission quality is ensured by transmitting data by using another TCP subflow.

Optionally, the transceiver 703 may be further configured to send an adjusted input item to the two communication parties, where the adjusted input item is obtained after the processor 702 adjusts the data transmission process on the at least one TCP subflow, and is used to trigger the two communication parties to perform the MPTCP congestion control algorithm.

In another embodiment, the two communication parties may detect by themselves input items of the algorithm, such as the RTT and the packet loss rate, which is not specially limited in this embodiment of the present invention.

The memory 701 may further store an instruction for the processor 702 to execute the following operation:

parsing a TCP data packet of the accessed user to obtain an MPTCP connection status of the accessed user. The MPTCP connection message is used to indicate a status of the MPTCP connection.

For specific content included in the MPTCP connection message and a specific method for determining the status of the MPTCP connection, reference may be made to related descriptions in the embodiment shown in FIG. 6, and details are not described herein again.

The memory 701 may further store an instruction for the processor 702 to execute the following operation:

reporting a measurement report to the data transmission control node, where the measurement report is used to indicate conditions of communication links of the multiple TCP subflows and/or radio resource statuses of network nodes corresponding to the multiple TCP subflows, and the measurement report is used by the data transmission control node to select the at least one TCP subflow.

For specific content in the measurement report and a specific reporting manner, reference may be made to related descriptions in the embodiment shown in FIG. 5, and details are not described herein again.

Optionally, in another embodiment of the present invention, the transceiver 703 may be further configured to report an MPTCP connection message to the data transmission control node, where the MPTCP connection message is used to indicate a status of the MPTCP connection, the MPTCP connection message carries MPTCP connection information, and the MPTCP connection information is used by the data transmission control node to associate the multiple TCP subflows with the MPTCP connection, so that the MPTCP connection includes the multiple TCP subflows.

Optionally, the processor 702 may be further configured to: identify an MPTCP connection status of an accessed user, and generate an MPTCP connection message corresponding to the MPTCP connection status.

For a specific identification manner, a type, content, and a reporting manner of the MPTCP connection message, reference may be made to related descriptions in other embodiments of the present invention, and details are not described herein again.

The network node may further include an antenna 704, a bus system 705, and the like. For a specific connection relationship, reference may be made to related descriptions in the embodiment shown in FIG. 6, and details are not described herein again.

By using the data transmission control node and the network node that are provided in this embodiment of the present invention, a TCP subflow on which data offloading needs to be performed is selected according to a requirement for running a system, and an adjustment policy is determined. By changing an input item of an MPTCP congestion control algorithm, data on the selected TCP subflow can be migrated to another expected TCP subflow that belongs to a same MPTCP connection as the selected TCP subflow. The adjustment policy includes satisfying a management and control policy of an operator, and reflecting a congestion status of a data transmission link that carries a TCP subflow, a radio resource status, and the link. By taking an additional measure to manage and control MPTCP data transmission on an access network side, a result of the data offloading can satisfy the expected requirement for running the system, so as to optimize system performance, and improve practicability of the MPTCP congestion control algorithm. In addition, instead of changing a congestion control algorithm in an existing protocol, input of the algorithm is changed to indirectly affect output of the algorithm, so as to obtain an expected data offloading result. The procedure is simple and easy for implementation.

Figure 8:
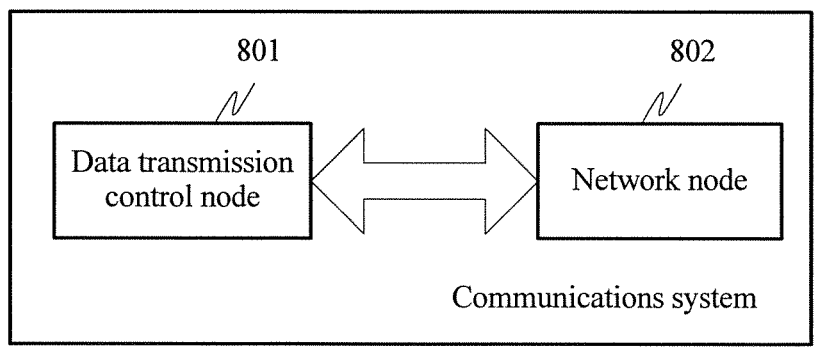
FIG. 8 is a schematic diagram of a communications system according to an embodiment of the present invention.

FIG. 8 is a schematic diagram of a communications system according to an embodiment of the present invention. The communications system includes a network node 801 and a data transmission control node 802, and both may perform direct or indirect communication by using a wired or wireless link.

The data transmission control node 801 is configured to: select at least one TCP subflow on which data transmission control needs to be performed from the multiple TCP subflows; determine an adjustment policy for an input item of an MPTCP congestion control algorithm; and send the adjustment policy to a network node corresponding to the at least one TCP subflow, where the adjustment policy is used to instruct the network node to adjust a data transmission process on the at least one TCP subflow and trigger the two communication parties to perform the MPTCP congestion control algorithm, and an output result of the MPTCP congestion control algorithm includes determining to migrate a part or all of data transmitted on the at least one TCP subflow to another TCP subflow that belongs to the MPTCP connection.

The network node 802 is located in a communication link between the two communication parties, and is configured to: receive information about the at least one TCP subflow selected by the data transmission control node from the multiple TCP subflows, and receive the adjustment policy indicated by the data transmission control node, where the adjustment policy is an adjustment policy for the input item of the MPTCP congestion control algorithm.

The data transmission control node 801 in the communications system may be the data transmission control node in the embodiment shown in FIG. 3 or FIG. 6, and the network node 802 may be the network node in the embodiment shown in FIG. 5 or FIG. 7. In the communications system, the data transmission management method and the TCP subflow association method in the embodiments shown in FIG. 9 to FIG. 11 may be executed. For detailed content, reference may be made to related descriptions in other embodiments of the present invention, and details are not described herein again.

By using the communications system provided in this embodiment of the present invention, a TCP subflow on which data offloading needs to be performed is selected according to a requirement for running a system. By changing an input item of an MPTCP congestion control algorithm, data on the selected TCP subflow can be migrated to another expected TCP subflow that belongs to a same MPTCP connection as the selected TCP subflow. By taking an additional measure to manage and control MPTCP data transmission on an access network side, a result of the data offloading on the TCP subflow can satisfy the expected requirement for running the system, so as to optimize system performance, and improve practicability of the MPTCP congestion control algorithm.

Figure 9:
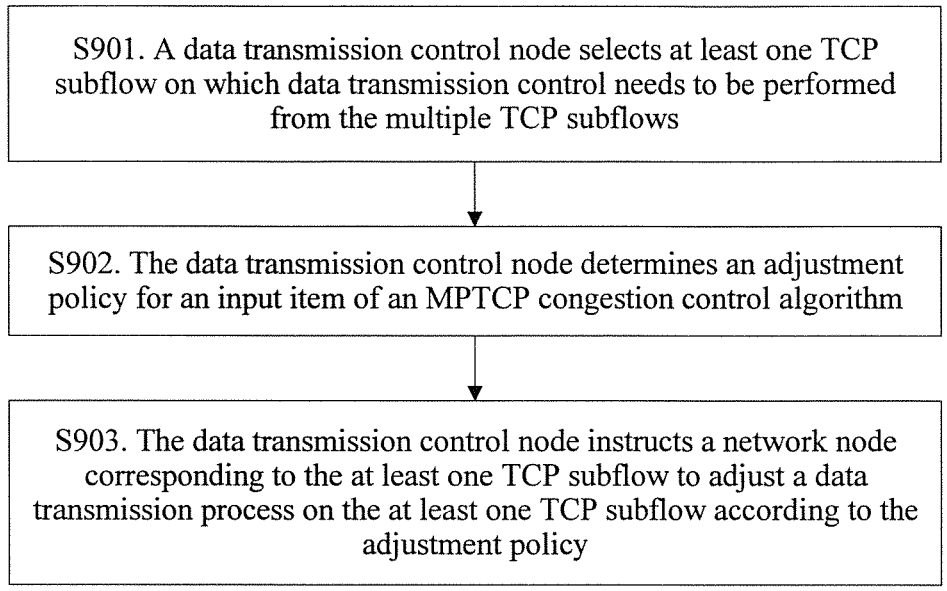
FIG. 9 is a schematic flowchart of a data transmission management method according to an embodiment of the present invention.

An embodiment of the present invention provides a data transmission management method, which may be executed by the data transmission control node in the embodiment shown in FIG. 3 or FIG. 6, and be used to control data transmission between two communication parties of a Multipath Transmission Control Protocol MPTCP connection, where the MPTCP connection includes multiple Transmission Control Protocol TCP subflows. FIG. 9 is a schematic flowchart of the method, and the method includes steps S901 to S903.

S901. The data transmission control node selects at least one TCP subflow on which data transmission control needs to be performed from the multiple TCP subflows.

Specifically, the data transmission control node may determine to select a TCP subflow on which air-interface downlink or uplink data is to be migrated to another TCP subflow that belongs to the same MPTCP connection, and classify, according to a data transmission direction, the TCP subflow on which data needs to be migrated into an air-interface downlink or uplink management and control subflow set.

S902. The data transmission control node determines an adjustment policy for an input item of an MPTCP congestion control algorithm.

Optionally, that the data transmission control node determines an adjustment policy for an input item of an MPTCP congestion control algorithm in S902 includes: determining, by the data transmission control node, to reduce a data transmission rate of the at least one TCP subflow, and determine a reduction degree of the data transmission rate.

Optionally, a round trip time (RTT) and/or a packet loss rate of a TCP layer that are/is used as the input item of the MPTCP congestion control algorithm may be changed, and an adjusted RTT and/or packet loss rate are/is used as the input item of the algorithm to affect the output result of the algorithm, so that data on all TCP subflows can complete a migration process that satisfies an expected requirement.

Optionally, the adjustment policy may include instructing the network node to delay sending a data packet on the at least one TCP subflow to increase the RTT, where a delay time is corresponding to the reduction degree of the data transmission rate.

Optionally, the adjustment policy may include instructing the network node to discard a service data packet on the at least one TCP subflow to increase the packet loss rate, where a quantity of discarded service data packets is corresponding to the reduction degree of the data transmission rate.

The foregoing processes for changing the RTT and the packet loss rate may be simultaneously performed, that is, the data transmission rate of the TCP subflow is changed by comprehensively using the RTT and the packet loss rate; or may be separately performed, which is not specially limited in this embodiment of the present invention.

For a specific method for changing the packet loss rate or the RTT, reference may be made to related content in the embodiment shown in FIG. 3, and details are not described herein again.

S903. The data transmission control node instructs a network node corresponding to the at least one TCP subflow to adjust a data transmission process on the at least one TCP subflow according to the adjustment policy and trigger the two communication parties to perform the MPTCP congestion control algorithm, where an output result of the MPTCP congestion control algorithm includes determining to migrate a part or all of data transmitted on the at least one TCP subflow to another TCP subflow that belongs to the MPTCP connection.

Optionally, a process for delivering the foregoing adjustment policy includes: traversing the air-interface downlink or uplink management and control subflow set, and delivering the adjustment policy to a network node in which each TCP subflow in the management and control subflow set is located. There may be multiple ways to determine to select a TCP subflow on which air-interface downlink or uplink data is to be migrated to another TCP subflow that belongs to the same MPTCP connection, which is not specially limited in this embodiment of the present invention. For a specific data migration method, reference may be made to related descriptions in the embodiment shown in FIG. 3, and details are not described herein again.

In another embodiment of the present invention, that the data transmission control node selects at least one TCP subflow on which data transmission control needs to be performed from the multiple TCP subflows in S901 includes: selecting, according to at least one condition in a management and control policy of an operator, a condition of a communication link, or radio resource statuses of network nodes corresponding to the TCP subflows of the MPTCP connection, the TCP subflow to perform offloading. The condition of the communication link and/or the radio resource statuses may be obtained from related information in a measurement report reported by the network node. For specific content, reference may be made to related descriptions in the embodiment shown in FIG. 3, and details are not described herein again.

Optionally, in another embodiment of the present invention, the data transmission control node associates the multiple TCP subflows with the MPTCP connection according to an MPTCP connection message, so that the MPTCP connection includes the multiple TCP subflows, where the MPTCP connection message is used to indicate a status of the MPTCP connection.

The MPTCP connection message may include an initial MPTCP connection establishment notification message that indicates completion of an initial MPTCP connection establishment process and a TCP subflow creation notification message that indicates that a TCP subflow that belongs to the MPTCP connection is created after an initial MPTCP connection establishment process is completed.

Optionally, the MPTCP connection message may further include an address addition notification message that indicates that an available address is added to a multi-address responder party of a created TCP subflow after an initial MPTCP connection establishment process is completed.

Optionally, the MPTCP connection message may further include a TCP subflow deletion notification message that indicates deletion of a currently used TCP subflow, a TCP subflow priority update notification message that indicates a change of a use priority of a TCP subflow, and the like. Changing a use priority of a TCP subflow means changing a backup state of a currently used TCP subflow.

Figure 10:
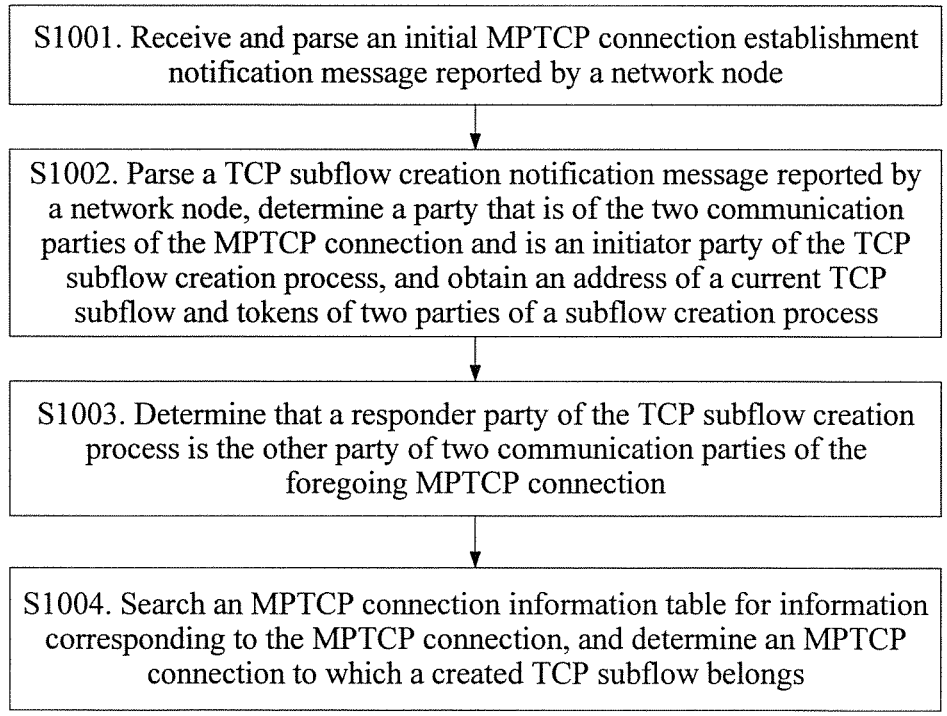
FIG. 10 is a schematic flowchart of a method for associating a TCP subflow with an MPTCP connection according to an embodiment of the present invention.

Specifically, a process for associating each TCP subflow managed by the data transmission control node with a corresponding MPTCP connection is shown in FIG. 10, and includes steps S1001 to S1004.

S1001. Parse an initial MPTCP connection establishment notification message reported by a network node, and obtain addresses and tokens that are of two communication parties of a current MPTCP connection.

S1002. Parse a TCP subflow creation notification message reported by the network node, determine a party that is of the two communication parties of the MPTCP connection and is an initiator party of the TCP subflow creation process, and obtain an address of a current TCP subflow and tokens of two parties of the subflow creation process.

S1003. Determine, according to a token of the initiator party of the TCP subflow creation process and the address of the current TCP subflow, that a responder party of the TCP subflow creation process is the other party of the two communication parties of the foregoing MPTCP connection, and obtain an address of the responder party.

S1004. Search an MPTCP connection information table for information corresponding to the MPTCP connection, and determine an MPTCP connection to which a created TCP subflow belongs.

Specifically, if it is found that a token of the responder party of the TCP subflow creation process is equal to a token of a party of an MPTCP connection, and that the address of the responder party of the TCP subflow creation process is equal to an address in an available address set of a party of the MPTCP connection, the created TCP subflow belongs to the MPTCP connection.

The determining process from step S1001 to step S1004 may be performed on each TCP subflow managed by the data transmission control node, so that multiple TCP subflows that belong to a same MPTCP connection are associated with the MPTCP connection.

By using the data transmission control method provided in this embodiment of the present invention, a TCP subflow on which data offloading needs to be performed is selected according to a requirement for running a system. By changing an input item of an MPTCP congestion control algorithm, data on the selected TCP subflow can be migrated to another expected TCP subflow that belongs to a same MPTCP connection as the selected TCP subflow. By taking an additional measure to manage and control MPTCP data transmission on an access network side, a result of the data offloading on the TCP subflow can satisfy the expected requirement for running the system, so as to optimize system performance, and improve practicability of the MPTCP congestion control algorithm.

Figure 11:
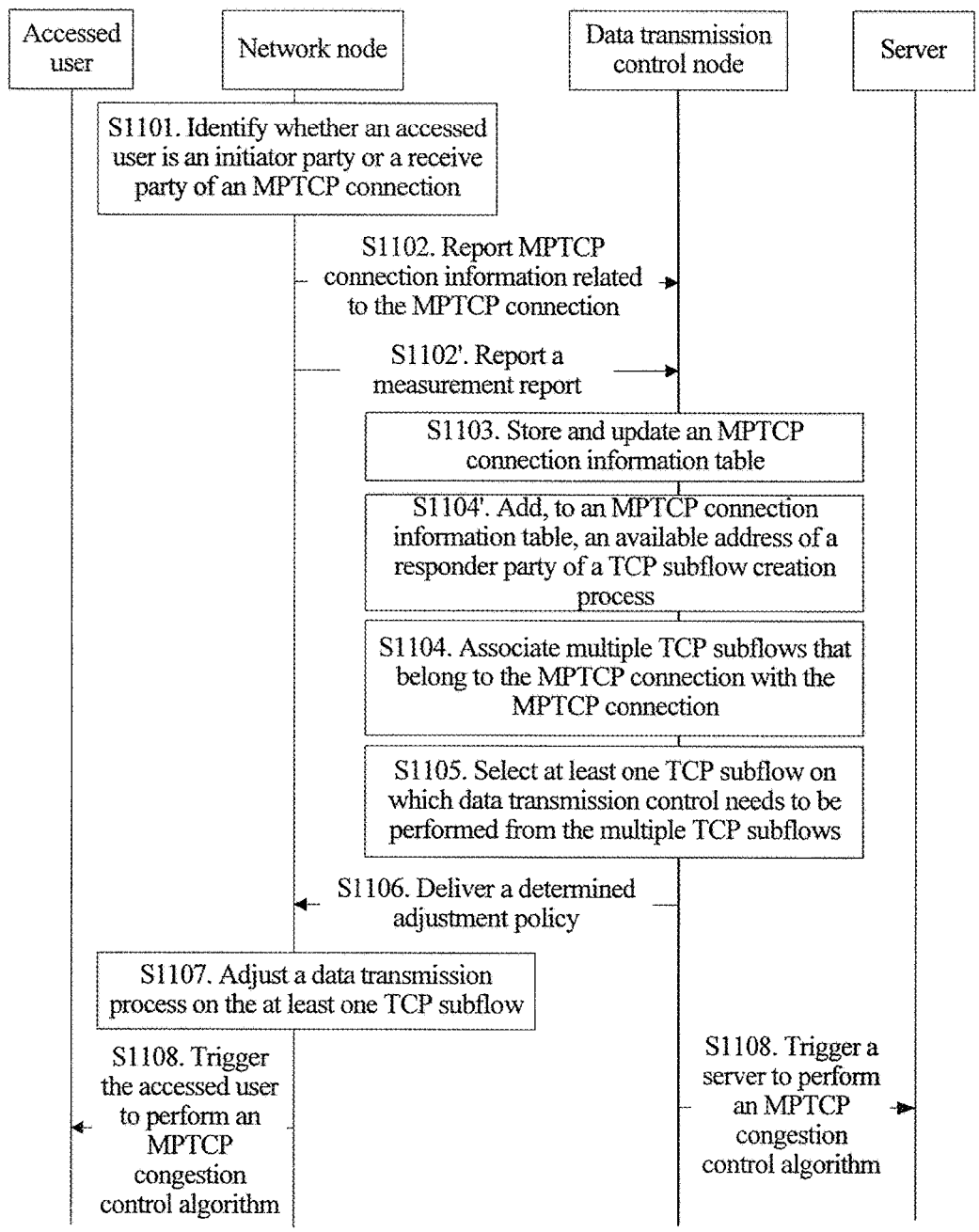
FIG. 11 is a schematic flowchart of another data transmission management method according to an embodiment of the present invention.

An embodiment of the present invention further provides a data transmission management method, used to control data transmission between two communication parties of a Multipath Transmission Control Protocol MPTCP connection, where the MPTCP connection includes multiple Transmission Control Protocol TCP subflows. FIG. 11 is a schematic flowchart of the method. As shown in the figure, the two communication parties may be user equipment and a server, and the method includes steps S1101 to S1108.

S1101. A network node identifies whether an accessed user is an initiator party or a receive party of the MPTCP connection.

A TCP data packet of the accessed user is parsed to obtain an MPTCP connection status of the accessed user. The MPTCP connection message is used to indicate a status of the MPTCP connection. Whether the accessed user is an MPTCP user may be identified by using a special field in the data packet. The accessed user refers to a logical unit corresponding to UE after the UE accesses a communications network by using an access network.

For specific content included in the MPTCP connection message and a specific method for determining the status of the MPTCP connection, reference may be made to related descriptions in the corresponding apparatus embodiment, and details are not described herein again.

S1102. The network node reports an MPTCP connection message to the data transmission control node, where the MPTCP connection message is used to indicate a status of the MPTCP connection, the MPTCP connection message carries MPTCP connection information, and the MPTCP connection information is used by the data transmission control node to associate the multiple TCP subflows with the MPTCP connection, so that the MPTCP connection includes the multiple TCP subflows.

Optionally, MPTCP messages that is reported by different types of network nodes and is of multiple TCP subflows that belong to a same MPTCP connection may be received. For example, MPTCP information that is reported by a BTS, a NodeB, and an AP and is of at least one TCP subflow that passes the network node is simultaneously received. For a specific reporting manner, reference may be made to related content in the apparatus embodiment, and details are not described herein again.

Optionally, in another embodiment of the present invention, the method may further include step S1102': The network node reports a measurement report to the data transmission control node, where the measurement report is used to indicate a condition of a communication link and/or a radio resource status.

Optionally, the measurement report for the network node may be reported only when a TCP subflow related to an MPTCP connection occurs at the network node, or a measurement report for an accessed user may be reported only when the accessed user has a TCP subflow related to an MPTCP connection.

For specific content in the measurement report and a specific reporting manner, reference may be made to related descriptions in the corresponding apparatus embodiment, and details are not described herein again.

There is no limitation on a sequence for executing step S1102 and step S1102', and S1102' may be executed before S1102 is executed.

S1103. The data transmission control node stores an MPTCP connection information table, and updates the MPTCP connection information table according to an obtained MPTCP connection message, where the MPTCP connection information table includes the MPTCP connection message reported by the network node.

Optionally, the MPTCP connection information table may include MPTCP connection messages that are reported by different network nodes and are about a same MPTCP connection, or may include MPTCP connection messages that are reported by different network nodes and are about different MPTCP connections. Management is performed on all TCP subflows by using an MPTCP connection as a classification criterion.

Optionally, when MPTCP connection messages that include different content are received, the foregoing MPTCP connection table may be correspondingly maintained. For specific processing processes corresponding to the various types of MPTCP connection messages, reference may be made to related descriptions in the apparatus embodiment, and details are not described herein again.

Optionally, when the measurement report that is reported by the network node and is about the condition of the communication link and/or the radio resource status of the network node is received, related network node information and/or accessed user information that are/is stored in the MPTCP connection information table may be updated.

S1104. The data transmission control node associates the multiple TCP subflows that belong to the MPTCP connection with the MPTCP connection according to the received MPTCP connection message.

For a specific method and procedure for associating a TCP subflow with a corresponding MPTCP connection, reference may be made to related descriptions in other embodiments of the present invention, and details are not described herein again.

Optionally, the MPTCP connection message further includes a TCP subflow deletion notification message and/or a TCP subflow priority update notification message. For a corresponding TCP subflow deletion process and a corresponding TCP subflow priority update process, reference may be made to related descriptions in the apparatus embodiment, and details are not described herein again.

Optionally, in a scenario in which for the two communication parties of the MPTCP connection, one party has multiple addresses, the other party has a single address, and the single-address party initiates a TCP subflow creation process, or in a scenario in which both parties have multiple addresses, before a party of the MPTCP connection initiates a TCP subflow creation process, a multi-address party may first initiate an address addition notification process to notify a peer end of an available address that needs to be added to the multi-address party during the TCP subflow creation process. If learning, by means of parsing, that an accessed user completes the foregoing address addition notification process, the network node reports an address addition notification message to the data transmission control node, and the address addition notification message includes an available address that needs to be added to a multi-address responder party of a TCP subflow creation process. Correspondingly, before step S1004, the method may further include step S1104': Add, to the MPTCP connection information table, an available address of a responder party of a TCP subflow creation process, where the responder party is a multi-address initiator party or a multi-address responder party of an initial MPTCP connection establishment process.

Congestion control on a TCP subflow is performed on a premise that TCP subflows that belong to a same MPTCP connection are associated with the MPTCP connection. That is, information needs to be cleared, such as an MPTCP connection to which a TCP subflow that may be used by current UE for data communication belongs and a network node accessed by the TCP subflow, and a status of the TCP subflow needs to be confirmed, so that congestion control can be performed on different TCP subflows that belong to a same MPTCP connection, and data offloading can be performed between the different TCP subflows.

S1105. The data transmission control node selects at least one TCP subflow on which data transmission control needs to be performed from the multiple TCP subflows.

S1106. The data transmission control node delivers a determined adjustment policy to the network node.

S1107. The network node performs the foregoing adjustment policy to adjust a data transmission process on the at least one TCP subflow.

Optionally, the network node may delay sending a data packet on the at least one TCP subflow to increase the RTT, where a delay time is corresponding to a reduction degree of the data transmission rate; and/or discard a service data packet on the at least one TCP subflow to increase the packet loss rate, where a quantity of discarded service data packets is corresponding to the reduction degree of the data transmission rate.

S1108. The network node sends, to the two communication parties, an input item obtained after the data transmission process on the TCP subflow is adjusted, and triggers the two communication parties to perform an MPTCP congestion control algorithm.

The adjusted input item is obtained after the network node adjusts the data transmission process on the at least one TCP subflow.

An output result of the foregoing MPTCP congestion control algorithm performed by the two communication parties includes determining to migrate a part or all of data transmitted on the at least one TCP subflow to another TCP subflow that belongs to the MPTCP connection, where the adjustment policy is an adjustment policy for an input item of the MPTCP congestion control algorithm.

Optionally, the data transmission control node may determine a specific implementation form of the foregoing adjustment policy, and delivers the specific implementation form of the adjustment policy to a corresponding network node for direct execution. Alternatively, the data transmission control node may give only a migration policy of a TCP subflow, and deliver the migration policy to a corresponding network node, and the network node determines by itself a specific form to be used to perform data migration.

For specific descriptions of the steps in this embodiment, reference may be made to related content in other embodiments of the present invention, and details are not described herein again.

By using the data transmission control method provided in this embodiment of the present invention, a TCP subflow on which data offloading needs to be performed is selected according to a requirement of running a system, and the adjustment policy is determined. By changing an input item of an MPTCP congestion control algorithm, data on the selected TCP subflow can be migrated to another expected TCP subflow that belongs to a same MPTCP connection as the selected TCP subflow. The adjustment policy includes satisfying a management and control policy of an operator, and reflecting a congestion status of a data transmission link that carries a TCP subflow, a radio resource status, and the link. By taking an additional measure to manage and control MPTCP data transmission on an access network side, a result of the data offloading can satisfy the expected requirement for running the system, so as to optimize system performance, and improve practicability of the MPTCP congestion control algorithm. In addition, instead of changing a congestion control algorithm in an existing protocol, input of the algorithm is changed to indirectly affect output of the algorithm, so as to obtain an expected data offloading result. The procedure is simple and easy for implementation.

It may be clearly understood by a person skilled in the art that, for the purpose of convenient and brief description, specific working processes of the foregoing system, apparatus, and method may be mutually referenced, and details are not described herein again.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially, or the part contributing to the prior art may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in the present application, it should be understood that the disclosed apparatus, system, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In addition, the described apparatuses, systems, methods, and schematic diagrams of different embodiments may be combined with or integrated with other systems, modules, technologies, or methods without departing from the scope of this application. In addition, the displayed or discussed mutual couplings or direct couplings or communication connections may be implemented through some interfaces. The indirect couplings or communication connections between the base stations or units may be implemented in electronic, mechanical, or other forms.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission control apparatus configured to control data transmission between two communication parties of a Multipath Transmission Control Protocol (MPTCP) connection, wherein the MPTCP connection comprises multiple Transmission Control Protocol (TCP) subflows, the apparatus comprising:
   a processor;
   a memory for storing instructions which, when executed by the processor, cause the apparatus to:
      select at least one TCP subflow on which data transmission control is to be performed from the multiple TCP subflows,
      determine to reduce a data transmission rate of the at least one TCP subflow,
      determine a reduction degree of the data transmission rate and determine a delay time corresponding to the data transmission rate, and
      determine an adjustment policy for an input item of an MPTCP congestion control algorithm, wherein the input item comprises a data round trip time (RTT) of the at least one TCP subflow;
   a transceiver configured to send the adjustment policy to a network node corresponding to the at least one TCP subflow;
   wherein the adjustment policy is for instructing the network node to delay sending a data packet on the at least one TCP subflow according to the delay time to increase the data RTT, wherein the increased data RTT is for triggering the two communication parties to perform the MPTCP congestion control algorithm, and an output result of the MPTCP congestion control algorithm comprises a determination to migrate a part or all of data transmitted on the at least one TCP subflow to another TCP subflow that belongs to the MPTCP connection; and
   wherein the network node is located in a communication link between the two communication parties.

2. The apparatus according to claim 1, wherein the input item of the MPTCP congestion control algorithm further comprises a packet loss rate of the at least one TCP subflow.

3. The apparatus according to claim 2, wherein the instructions further cause the apparatus to:
   instruct the network node to discard a service data packet on the at least one TCP subflow to increase the packet loss rate, wherein a quantity of discarded service data packets corresponds to the reduction degree of the data transmission rate.

4. The apparatus according to claim 1, wherein the instructions further cause the apparatus to:
   determine, according to radio resource statuses of network nodes corresponding to the multiple TCP subflows, a network node on which the data transmission control is to be performed; and
   select at least one TCP subflow that corresponds to the network node and on which data is being transmitted.

5. The apparatus according to claim 1, wherein the instructions further cause the apparatus to:
   determine whether conditions of communication links in which the multiple TCP subflows are located satisfy a preset condition; and
   select at least one TCP subflow on which data is being transmitted from TCP subflows that do not satisfy the preset condition.

6. The apparatus according to claim 1, wherein the instructions further cause the apparatus to:
   associate the multiple TCP subflows with the MPTCP connection according to an MPTCP connection message, to make the MPTCP connection comprise the multiple TCP subflows, wherein the MPTCP connection message is for indicating a status of the MPTCP connection.

7. The apparatus according to claim 6, wherein the instructions further cause the apparatus to:

store and update an MPTCP connection information table comprising MPTCP connection information carried in the MPTCP connection message reported by the network node, wherein the MPTCP connection information is for associating the multiple TCP subflows with the MPTCP connection.

8. A data transmission management method for controlling data transmission between two communication parties of a Multipath Transmission Control Protocol (MPTCP) connection, wherein the MPTCP connection comprises multiple Transmission Control Protocol (TCP) subflows, the method comprising:

selecting, by a data transmission control node, at least one TCP subflow on which data transmission control is to be performed from the multiple TCP subflows;

determining, by the data transmission control node, to reduce a data transmission rate of the at least one TCP subflow;

determining, by the data transmission control node, a reduction degree of the data transmission rate and determining a delay time corresponding to the data transmission rate;

determining, by the data transmission control node, an adjustment policy for an input item of an MPTCP congestion control algorithm, wherein the input item comprises a data round trip time (RTT) of the at least one TCP subflow; and instructing, by the data transmission control node, a network node corresponding to the at least one TCP subflow to delay sending a data packet on the at least one TCP subflow according to the delay time to increase the data RTT, wherein the increased data RTT is for triggering the two communication parties to perform the MPTCP congestion control algorithm, wherein an output result of the MPTCP congestion control algorithm comprises a determination to migrate a part or all of data transmitted on the at least one TCP subflow to another TCP subflow that belongs to the MPTCP connection.

9. The method according to claim 8, wherein the input item of the MPTCP congestion control algorithm further comprises a packet loss rate of the at least one TCP subflow.

10. The method according to claim 9, further comprising:

instructing, by the data transmission control node, the network node to discard a service data packet on the at least one TCP subflow to increase the packet loss rate, wherein a quantity of discarded service data packets corresponds to the reduction degree of the data transmission rate.

11. The method according to claim 8, wherein selecting, by a data transmission control node, at least one TCP subflow on which data transmission control needs to be performed from the multiple TCP subflows comprises:

determining, by the data transmission control node according to radio resource statuses of network nodes corresponding to the multiple TCP subflows, a network node on which the data transmission control is to be performed; and selecting at least one TCP subflow that corresponds to the network node and on which data is being transmitted.

12. The method according to claim 8, wherein selecting, by a data transmission control node, at least one TCP subflow on which data transmission control needs to be performed from the multiple TCP subflows comprises:

determining, by the data transmission control node, whether conditions of communication links in which the multiple TCP subflows are located satisfy a preset condition; and selecting at least one TCP subflow on which data is being transmitted from TCP subflows that do not satisfy the preset condition.

13. The method according to claim 8, further comprising:

associating, by the data transmission control node, the multiple TCP subflows with the MPTCP connection according to an MPTCP connection message, so that the MPTCP connection comprises the multiple TCP subflows, wherein the MPTCP connection message is for indicating a status of the MPTCP connection.

14. The method according to claim 13 further comprising:

storing and updating, by the data transmission control node, an MPTCP connection information table comprising MPTCP connection information carried in the MPTCP connection message reported by the network node, wherein the MPTCP connection information is for associating the multiple TCP subflows with the MPTCP connection.

15. The method according to claim 8, wherein:

one of the two communication parties is a terminal accessing the network node, and the other of the two communication parties is a server; and the network node supports mutual communication between the terminal and the server.

16. A communications system, comprising:

a data transmission control apparatus configured to:

select at least one Transmission Control Protocol (TCP) subflow on which data transmission control is to be performed from multiple TCP subflows, determine to reduce a data transmission rate of the at least one TCP subflow, determine a reduction degree of the data transmission rate and determine a delay time corresponding to the data transmission rate, determine an adjustment policy for an input item of an Multipath Transmission Control Protocol (MPTCP) congestion control algorithm, wherein the input item comprises a data round trip time (RTT) of the at least one TCP subflow, and send the adjustment policy to a network access apparatus corresponding to the at least one TCP subflow, wherein the adjustment policy is for instructing the network access apparatus to delay sending a data packet on the at least one TCP subflow according to the delay time to increase the data RTT, wherein the increased data RTT is for triggering two communication parties of a MPTCP connection to perform the MPTCP congestion control algorithm, and an output result of the MPTCP congestion control algorithm comprises a determination to migrate a part or all of data transmitted on the at least one TCP subflow to another TCP subflow that belongs to the MPTCP connection; and wherein the network access apparatus, located in a communication link between the two communication parties, is configured to:

receive information about the at least one TCP subflow selected by the data transmission control apparatus from the multiple TCP subflows, and receive the adjustment policy indicated by the data transmission control apparatus, wherein the adjustment policy is an adjustment policy for the input item of the MPTCP congestion control algorithm.

* * * * *